Sept. 17, 1940.  R. I. WILCOX  2,215,141

AUTOMATIC PHONOGRAPH

Filed Aug. 21, 1937  20 Sheets-Sheet 1

Inventor:
Russell I. Wilcox
By Williams, Bradbury, McCaleb & Hinkle
Attys

Sept. 17, 1940.　　　R. I. WILCOX　　　2,215,141
AUTOMATIC PHONOGRAPH
Filed Aug. 21, 1937　　　20 Sheets-Sheet 3

Inventor:
Russell I Wilcox
By
Williams, Bradbury, McCaleb & Hinkle
Attys.

Sept. 17, 1940.  R. I. WILCOX  2,215,141
AUTOMATIC PHONOGRAPH
Filed Aug. 21, 1937  20 Sheets-Sheet 6
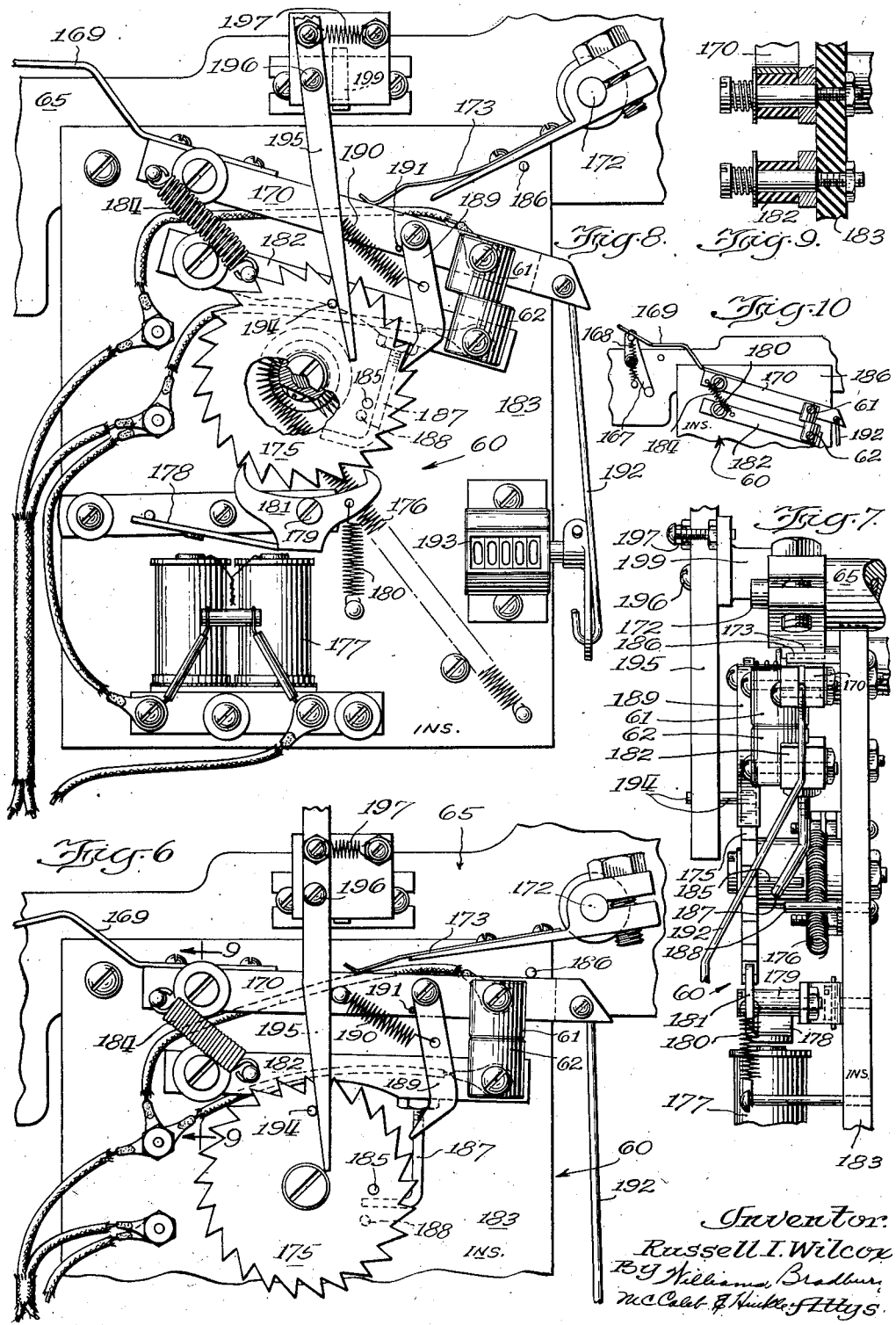

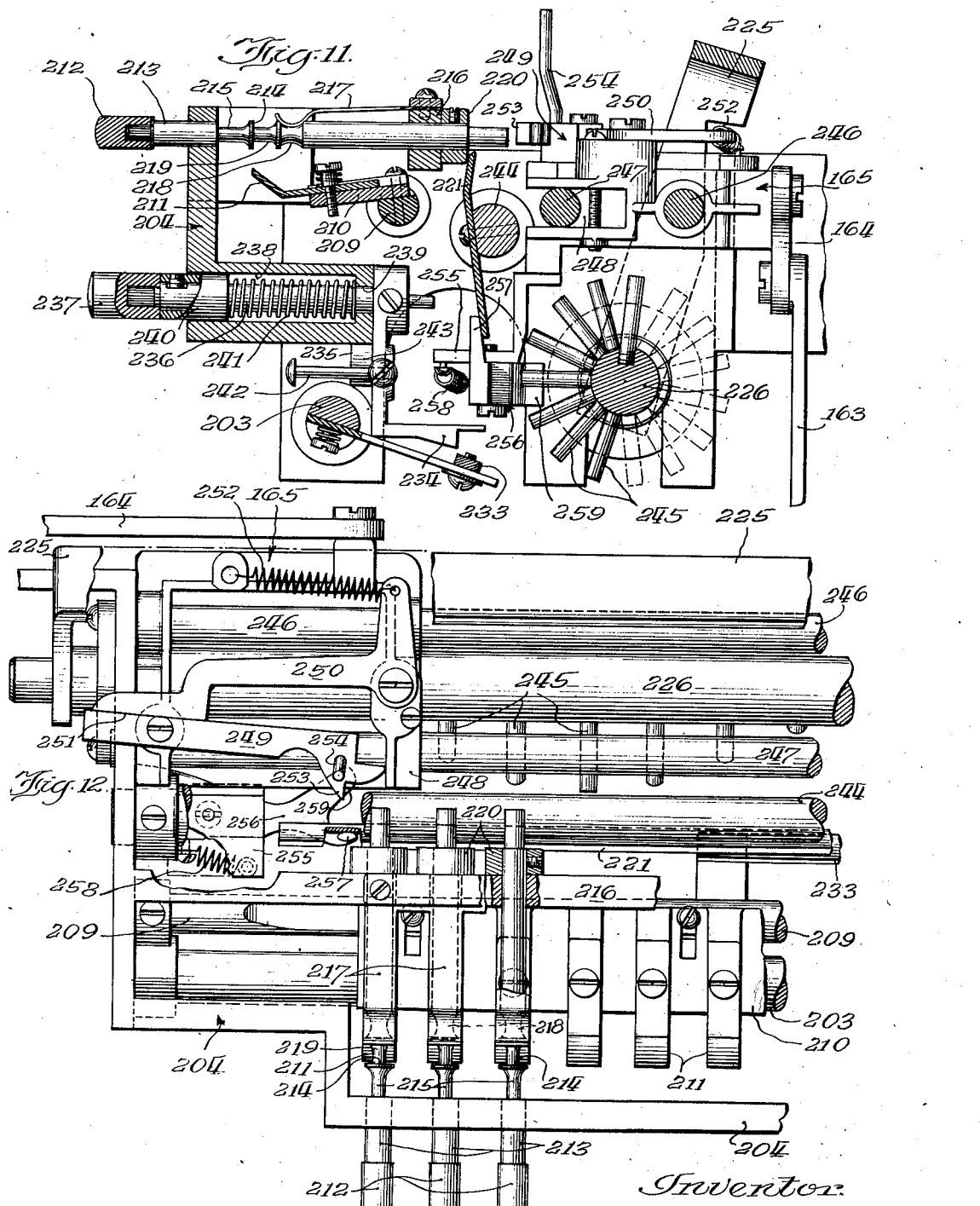

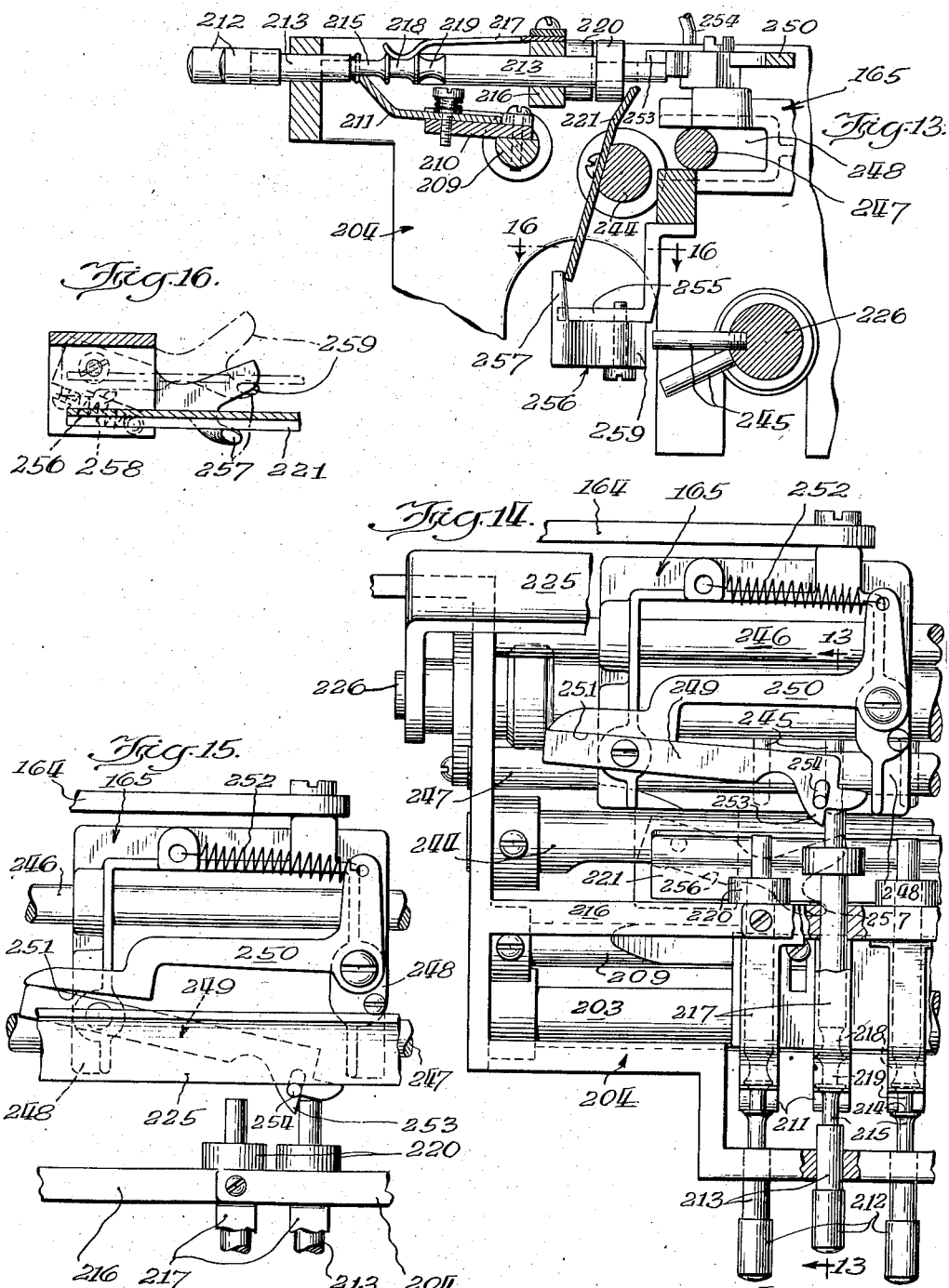

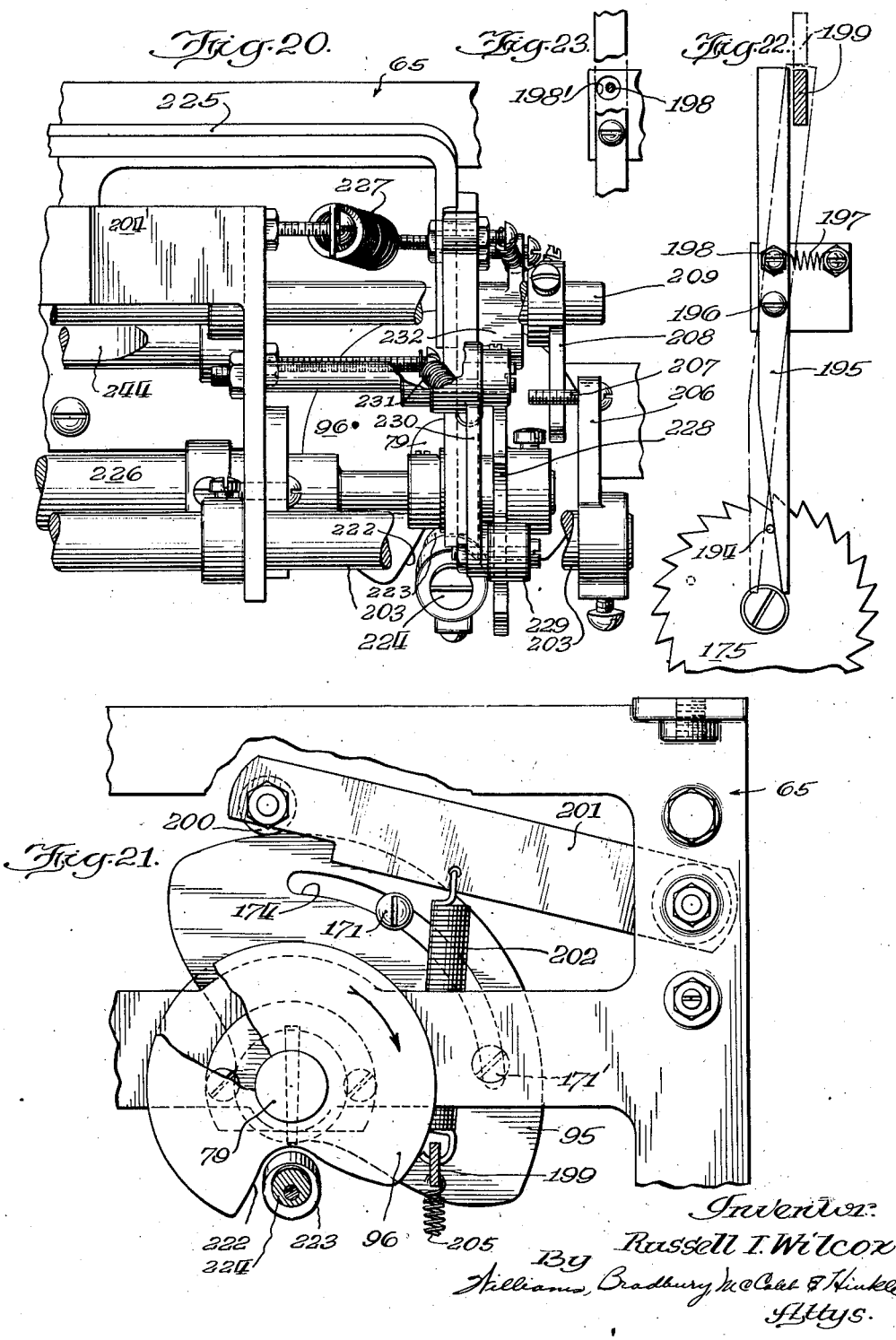

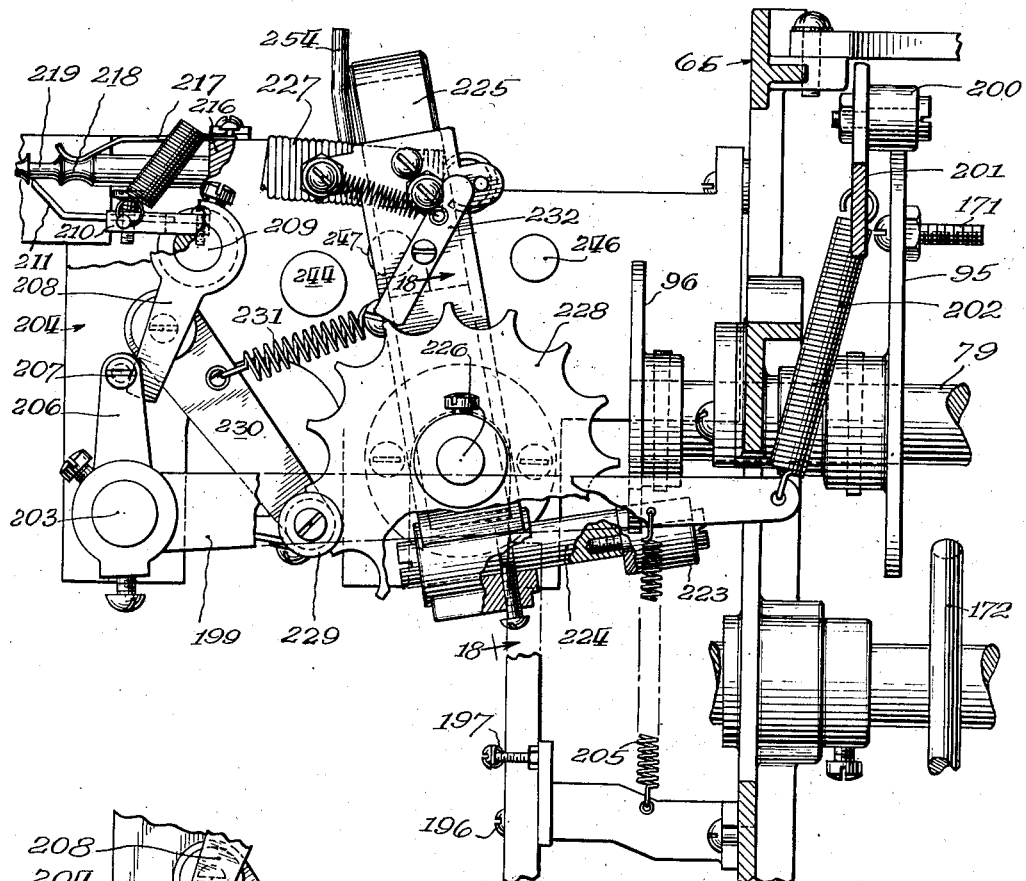
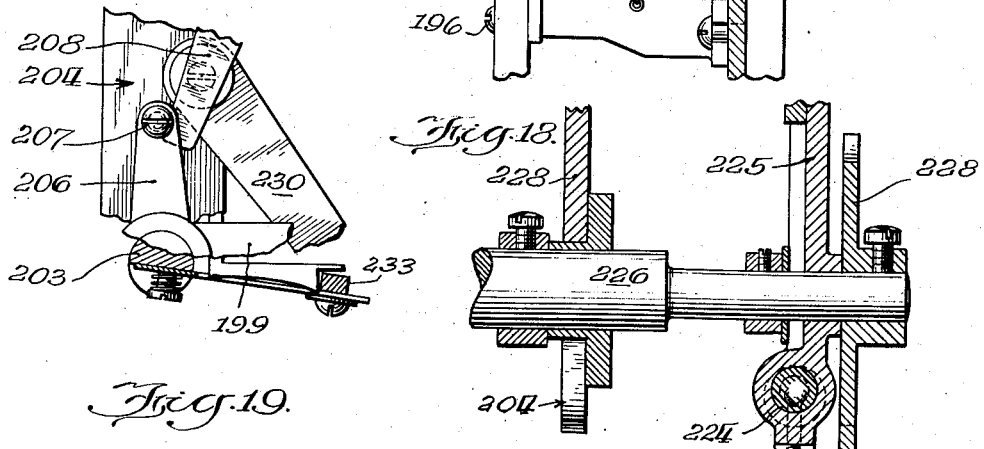

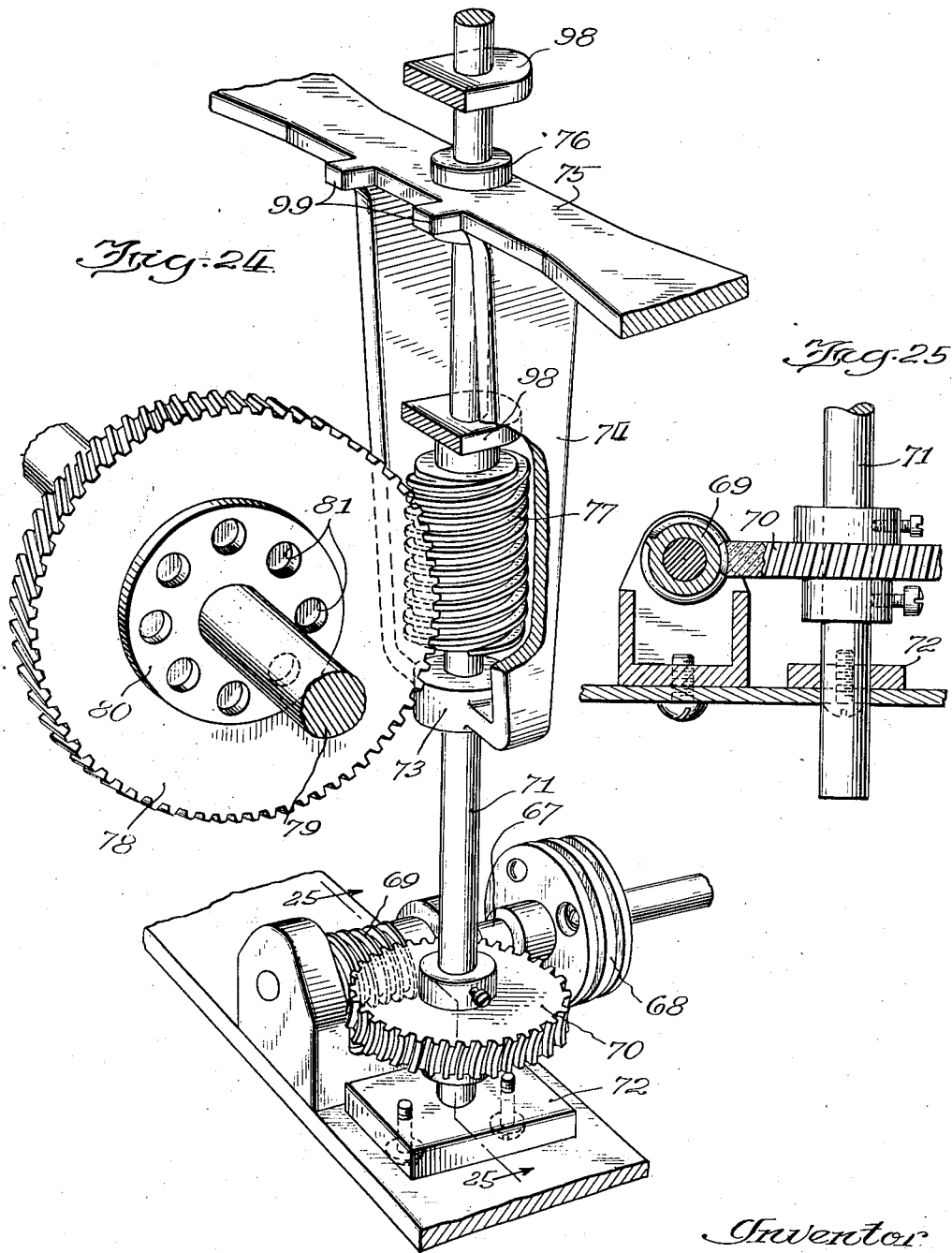

Sept. 17, 1940.        R. I. WILCOX        2,215,141
AUTOMATIC PHONOGRAPH
Filed Aug. 21, 1937        20 Sheets-Sheet 12

Inventor:
Russell I. Wilcox
By Williams, Bradbury, McCaleb & Hinkle
Attys.

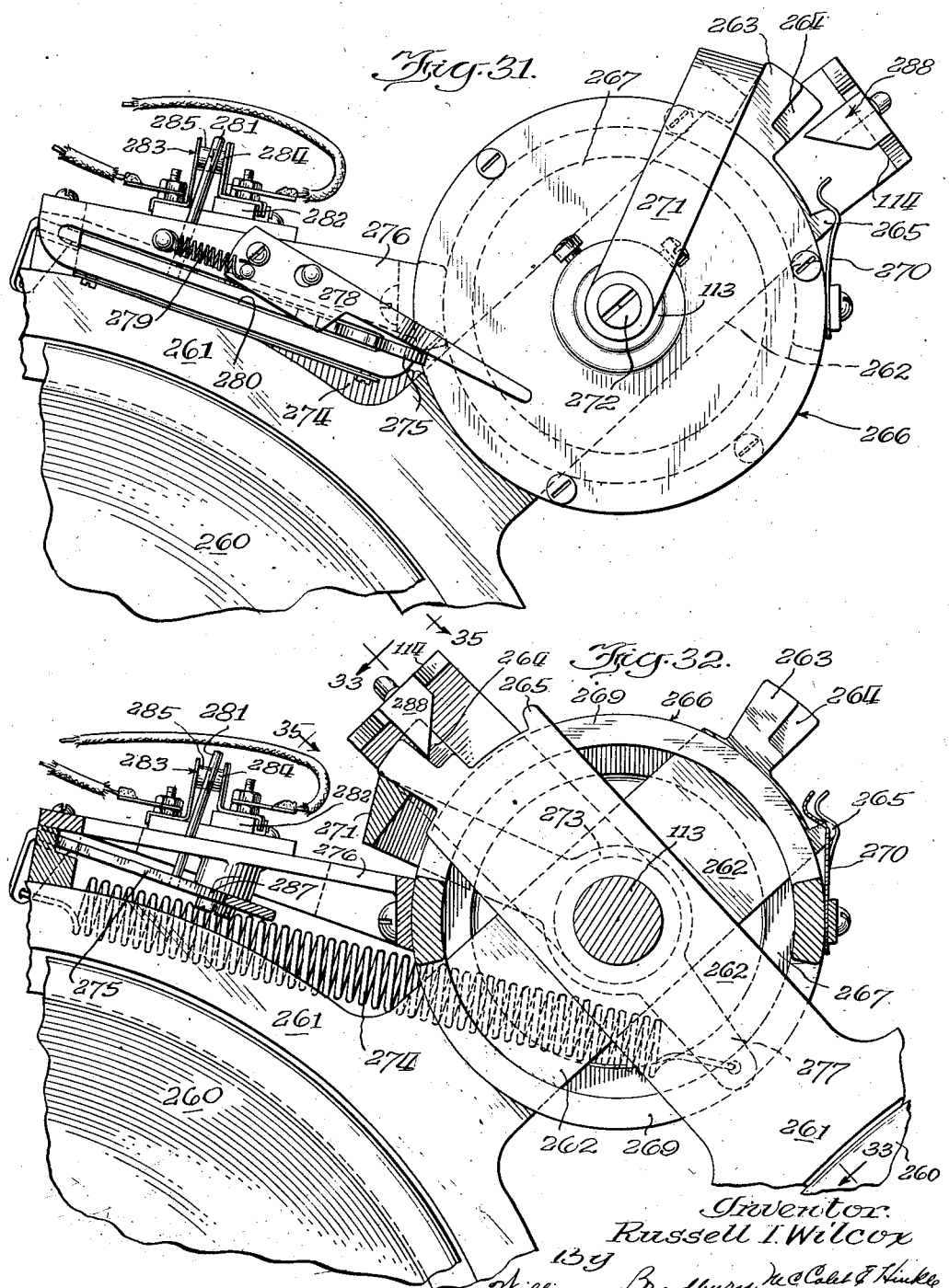

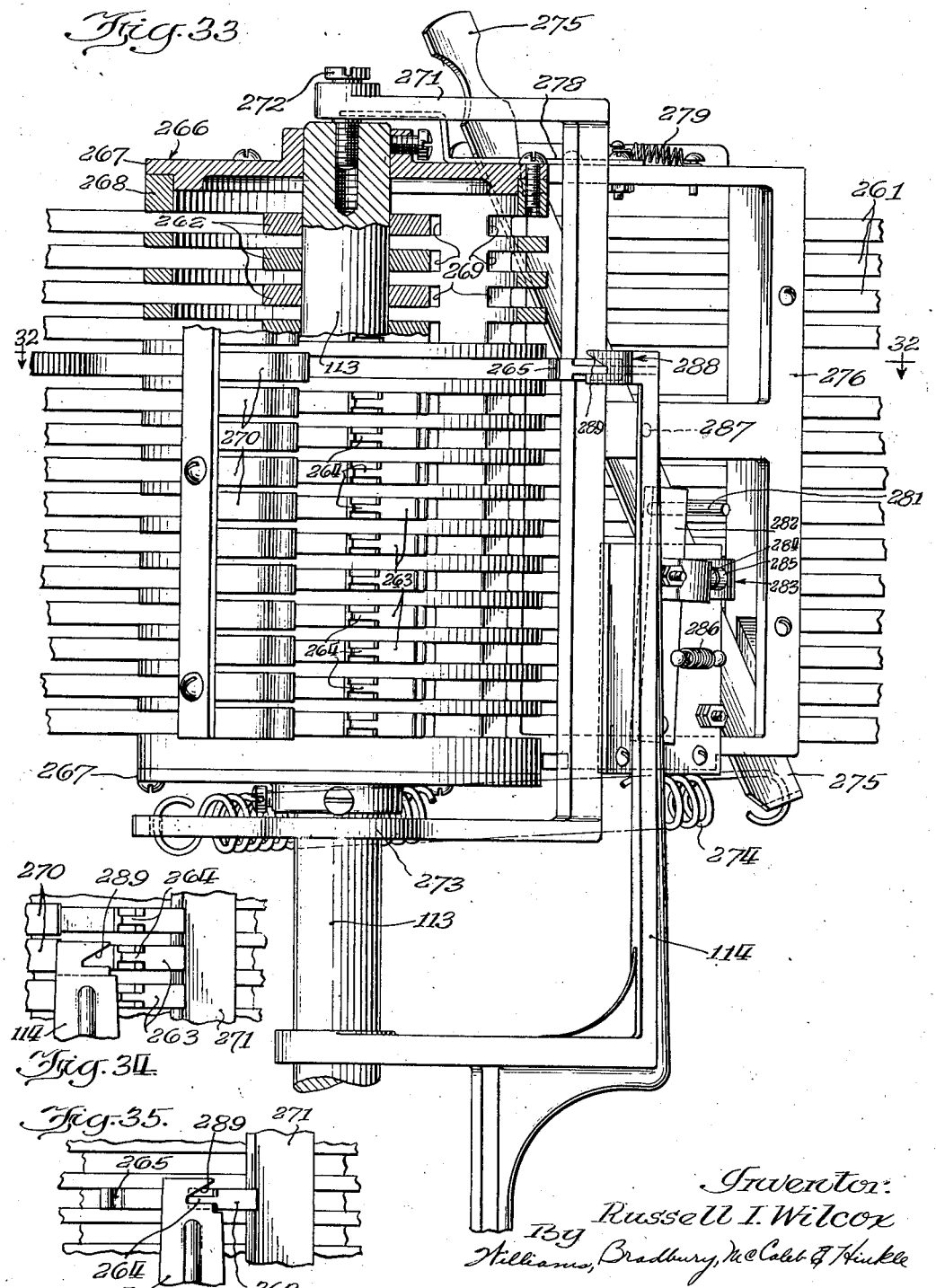

Sept. 17, 1940. R. I. WILCOX 2,215,141
AUTOMATIC PHONOGRAPH
Filed Aug. 21, 1937 20 Sheets-Sheet 16
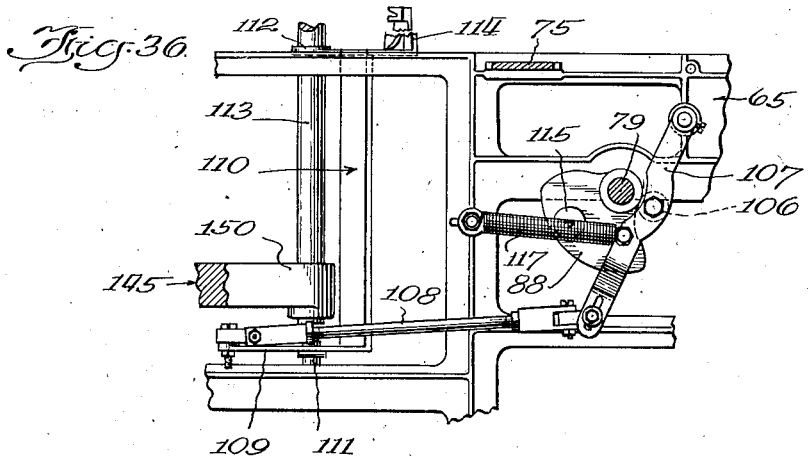
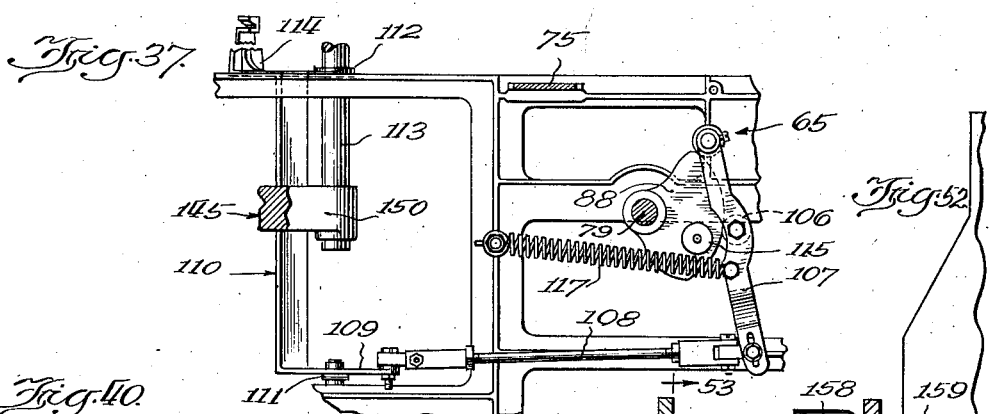
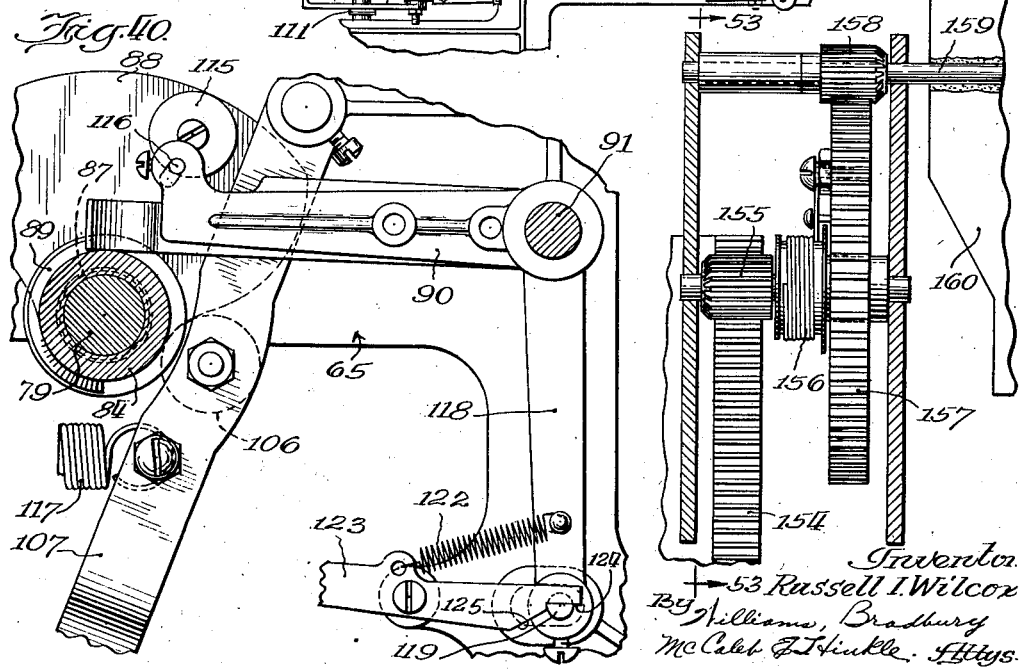

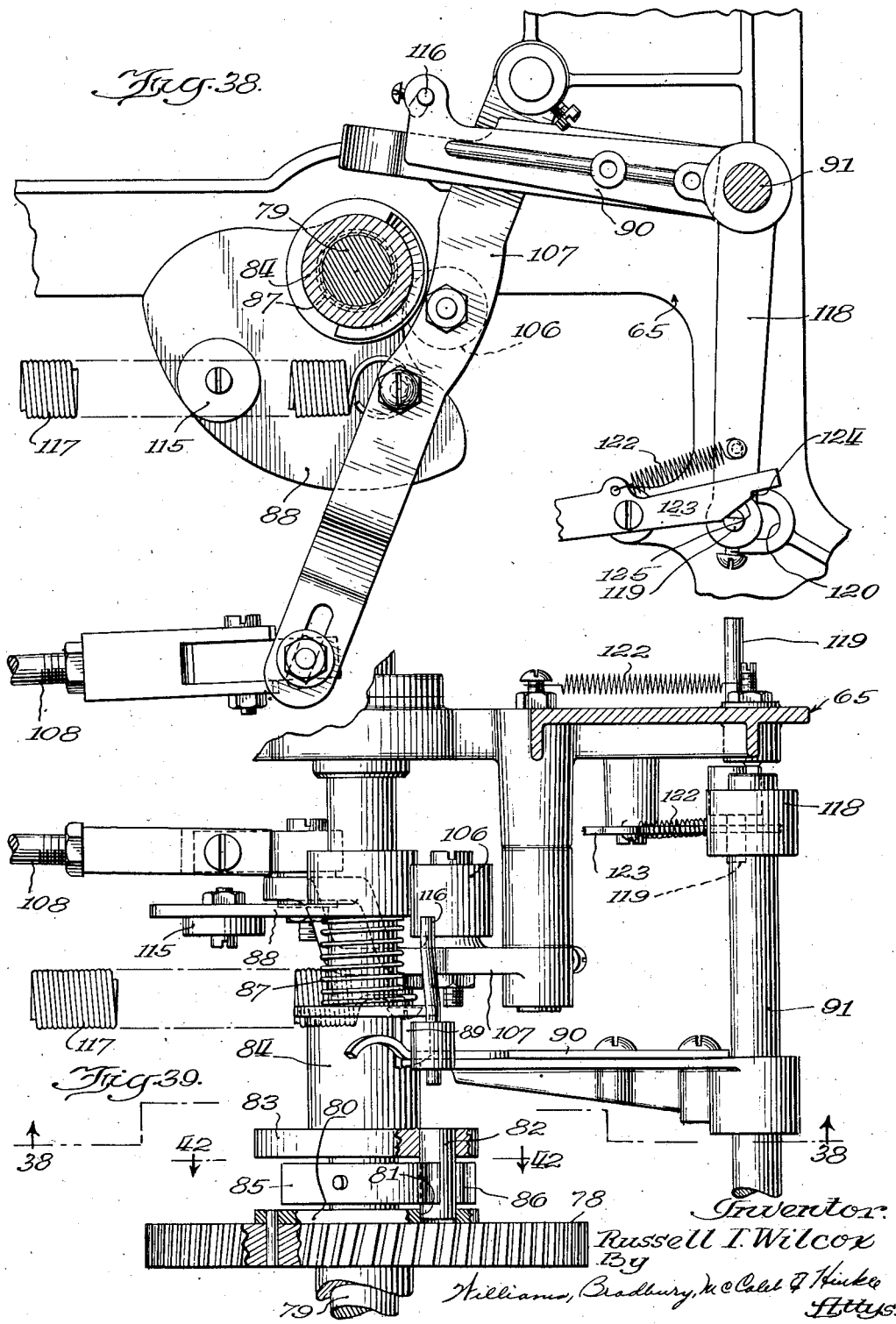

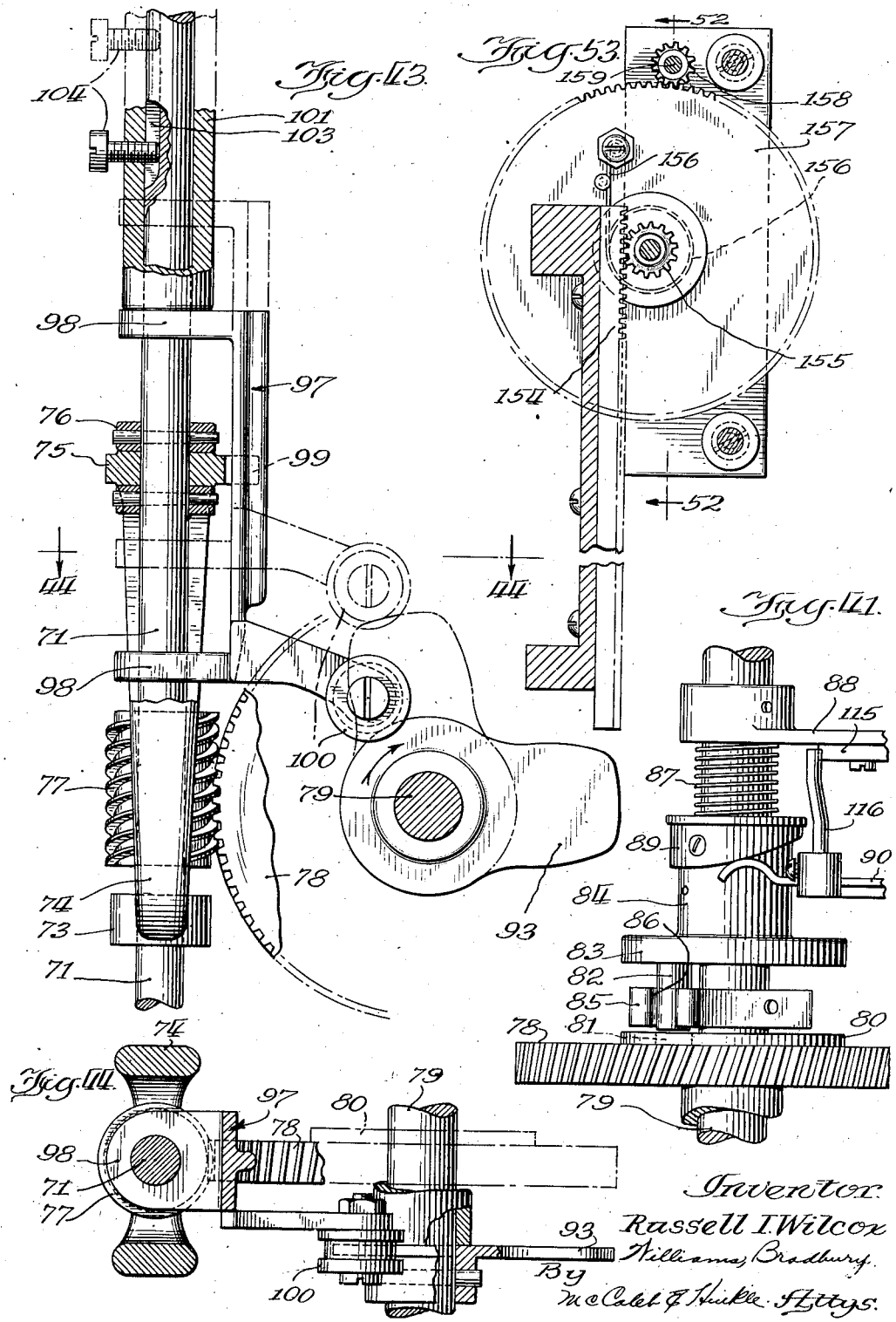

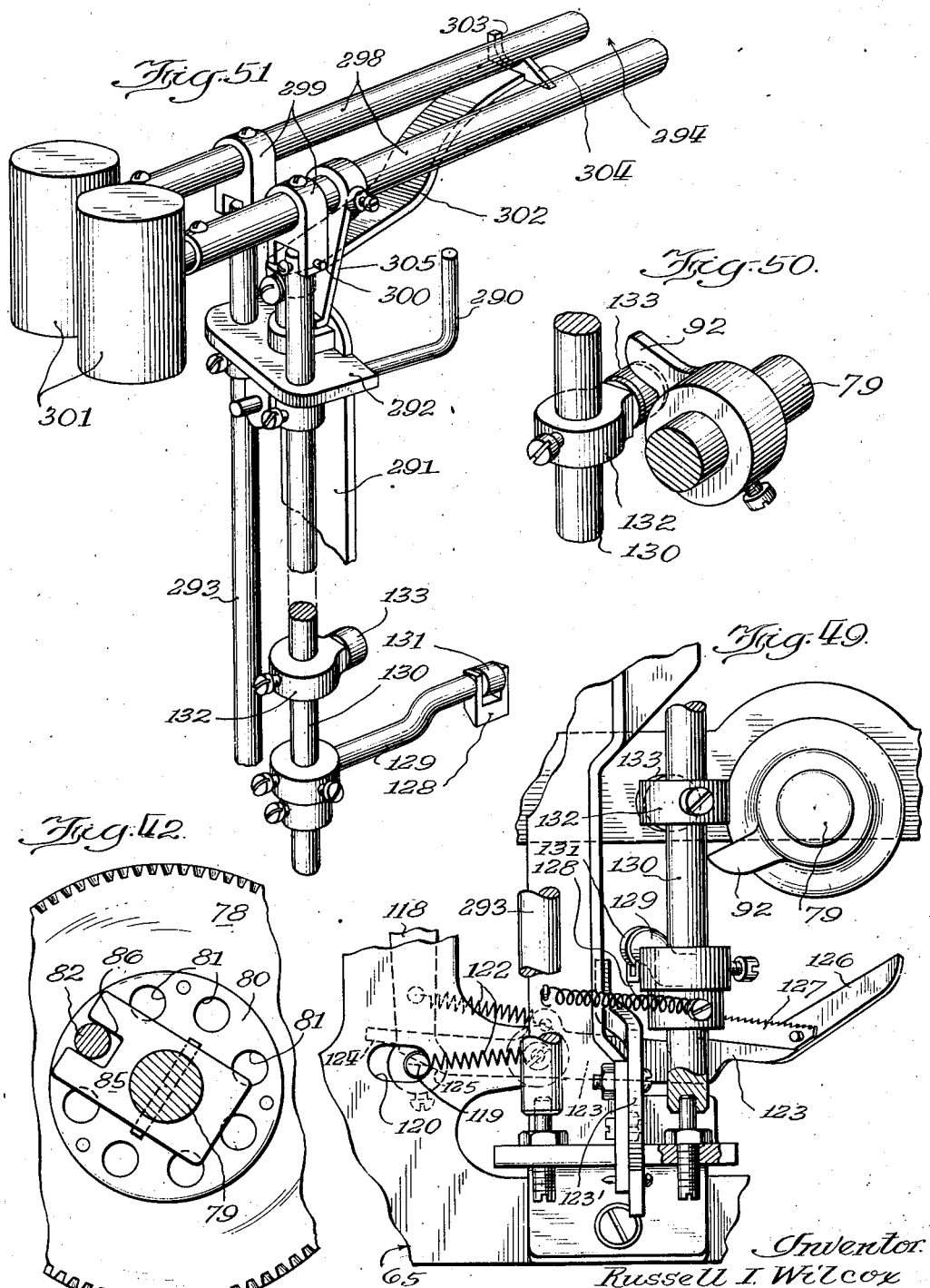

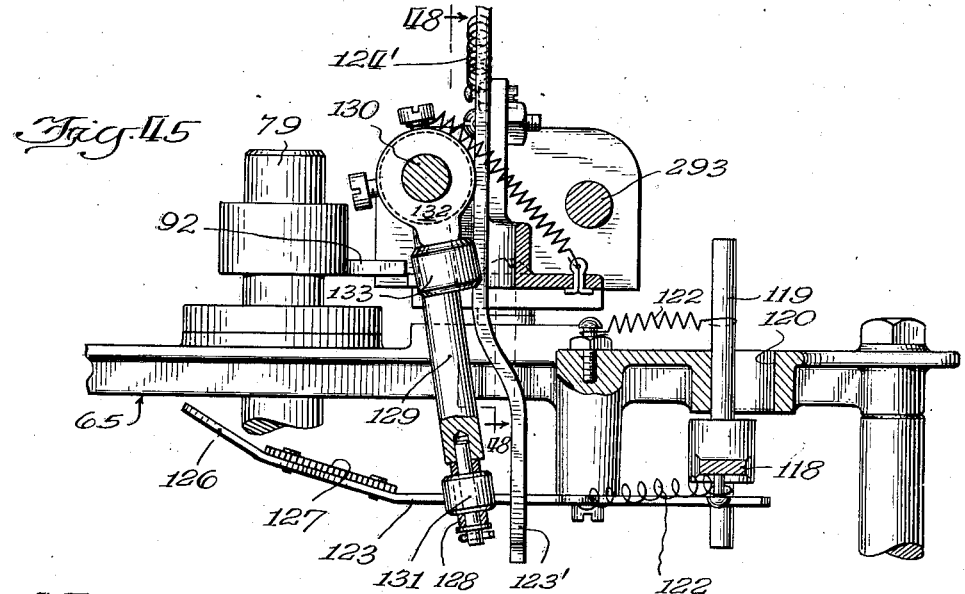
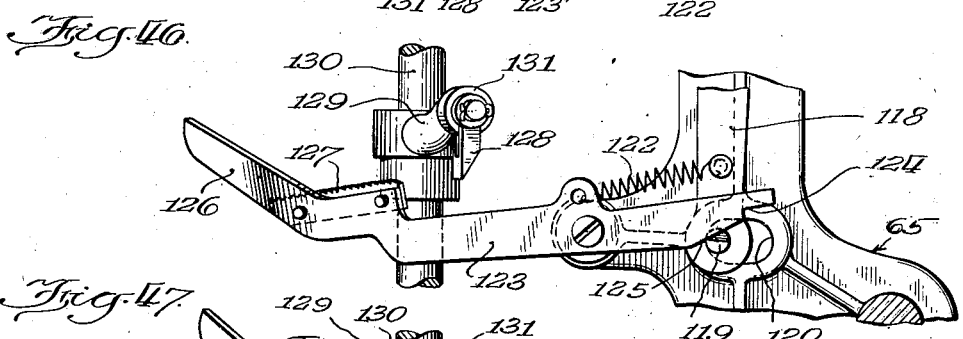
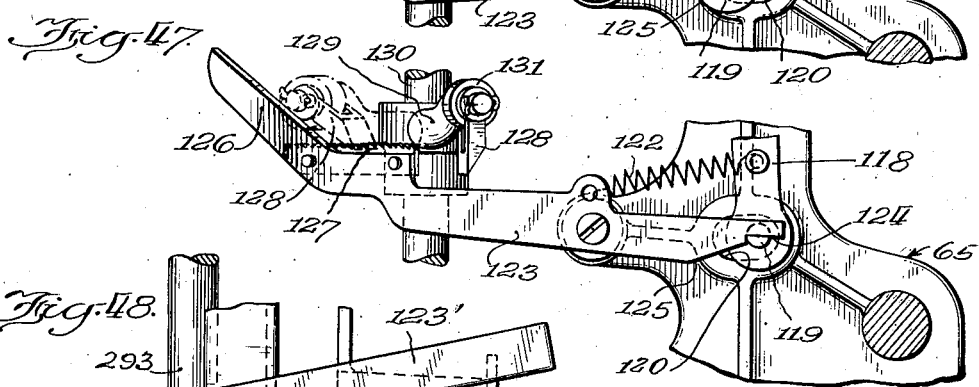
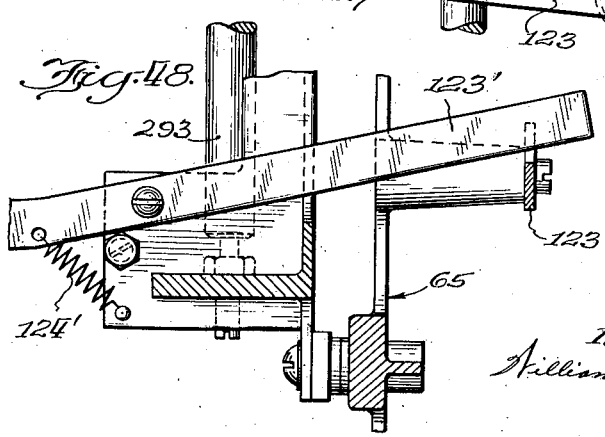

Patented Sept. 17, 1940

2,215,141

UNITED STATES PATENT OFFICE 2,215,141

AUTOMATIC PHONOGRAPH

Russell I. Wilcox, Chicago, Ill., assignor of one-half to Justus P. Seeburg, Chicago, Ill.

Application August 21, 1937, Serial No. 160,235

14 Claims. (Cl. 274—10)

This invention relates to automatic phonographs which are adapted to play a sequence of records and has for its principal object to provide an improved phonograph of this type.

The present phonograph is particularly intended for employment as a coin-operated phonograph which permits an appropriate number of selections to be played corresponding to coins inserted by a patron.

One of the objects of the invention is to provide a phonograph having a multi-selector whereby a sequence of records may be selected for playing, which multi-selector is automatically rendered incapable of change during the playing of the sequence.

A further object of the invention is to provide an automatic phonograph having a multi-selector which is automatically rendered incapable of change during the playing of all except the last of a sequence of records.

A further object of the invention is to provide an automatic phonograph having a manually operated multi-selector and an automatic multi-selector which is adapted to be rendered ineffective by use of the manual selector.

A further object of the invention is to provide an improved manually operable multi-selector.

A further object of the invention is to provide an improved multi-selector in which the manual operating means are located in a straight line.

A further object of the invention is to provide an improved arrangement of record carriers in which a stack of records is adapted to be supported, having common actuating members.

Other objects of the invention will hereinafter appear from the following description of a preferred embodiment of the invention, taken in conjunction with the accompanying drawings, in which:

Fig. 6 is a fragmentary view of the accumulator switch, the parts being shown in normal playing relation;

Fig. 7 is an elevation thereof as viewed from the right;

Fig. 8 is a front view of the accumulator switch showing the elements in the position in which they are located during normal operation;

Fig. 9 is a section detail view, taken on the line 9—9 of Fig. 6;

Fig. 10 is a diagrammatic view showing the switch set for continuous operation;

Fig. 11 is a sectional view through the selector mechanism, the section being taken on the line 11—11 of Fig. 2;

Fig. 12 is a plan view of the left-hand end of the selector mechanism;

Fig. 13 is a fragmentary sectional view through the selector, the section being taken on the line 13—13 of Fig. 14;

Fig. 14 is a plan view similar to Fig. 12, showing the selector carriage in an arrested position;

Fig. 15 is a fragmentary view corresponding to Fig. 14, showing the elements in a different position during operation;

Fig. 16 is a sectional plan detail, the section being taken on the line 16—16 of Fig. 13;

Fig. 17 is a fragmentary end elevation of the selector mechanism;

Fig. 18 is a fragmentary sectional detail view, taken on the line 18—18 of Fig. 17;

Fig. 19 is a fragmentary elevation of certain elements shown in Fig. 17, parts of the machine being shown in section, taken on the medial plane of the machine so as to show the manner in which the discharge button is locked;

Fig. 20 is a front elevation of the right-hand end of the selector;

Fig. 21 is a fragmentary sectional elevation, taken on the line 21—21 of Fig. 3, showing the forward end of the main cam shaft and certain of the cams carried thereby;

Fig. 22 is an elevational view of the latch lever for controlling the locking of the selector;

Fig. 23 is a fragmentary view showing the manner in which the movement of said latch lever is limited.

Fig. 24 is a fragmentary perspective view showing the drive for the turntable and the main cam shaft;

Fig. 25 is a sectional detail, taken on the line 25—25 of Fig. 24;

Fig. 31 is a fragmentary plan view of the means for supporting the record carriers;

Fig. 32 is a sectional plan view, the section being taken on the line 32—32 of Fig. 33, showing one carrier displaced to bring the record into alignment with the turntable;

Fig. 33 is a sectional view, partly in section, of the means for carrying the record carriers;

Fig. 34 is a fragmentary elevation showing part of the record supporting means;

Fig. 35 is a similar view showing the parts in a different relation;

Fig. 36 is a fragmentary sectional view with numerous parts omitted, showing the mechanism for swinging the record carriers;

Fig. 37 is a similar view showing the swinging apparatus in the swung position;

Fig. 38 is a sectional view, taken on the line 38—38 of Fig. 39, showing part of the means for swinging the record carriers and certain details of the latch and clutch;

Fig. 39 is a sectional plan view corresponding to Fig. 38;

Fig. 40 is a fragmentary sectional elevation similar to Fig. 38, showing the parts in modified relationship;

Fig. 41 is a fragmentary plan view showing the clutch of the main cam shaft in unclutching relation, these parts being differently arranged from their position shown in Fig. 39;

Fig. 42 is a sectional detail, taken on the line 42—42 of Fig. 3;

Fig. 43 is a fragmentary sectional detail showing the turntable spindle and the means for turning the turntable, as viewed on the line 43—43 of Fig. 3;

Fig. 44 is a fragmentary sectional plan view of the mechanism shown in Fig. 43;

Fig. 45 is a sectional plan detail view, taken on the line 45—45 of Fig. 5;

Fig. 46 is an elevational view of the mechanism shown in Fig. 45;

Fig. 47 is a similar elevational view showing the parts in a different relation;

Fig. 48 is a fragmentary sectional elevational view, taken on the line 48—48 of Fig. 45;

Fig. 49 is a fragmentary elevational view on the rear side of the machine, taken on the line 49—49 of Fig. 3, showing the mechanical connections which actuate and are actuated by the tone arm;

Fig. 50 is a perspective view of elements shown in said figure, illustrating more clearly the manner in which they cooperate;

Fig. 51 is a perspective view of the tone arm and associated parts dissociated from the remainder of the machine for the purpose of clarity;

Fig. 52 is a sectional view, taken on the line 52—52 of Fig. 4, showing retarding means for slowing down the descent of the stack of records when same is released, and Fig. 53 is a sectional view, taken on the line 53—53 of Fig. 52, showing the retarding mechanism.

Figure 1:
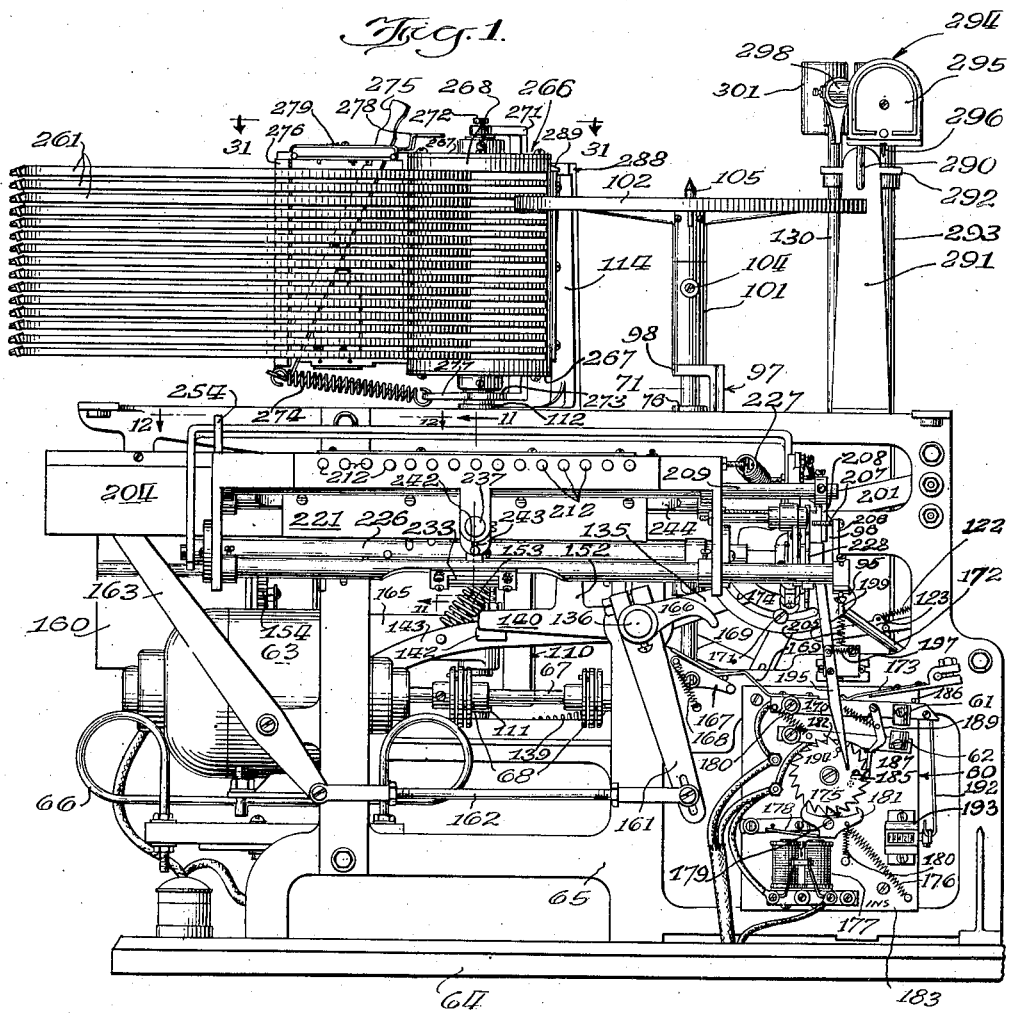
Figure 1 is a front elevation of the improved phonograph, the cabinet normally enclosing the same and the electrical amplifying and sound producing system being omitted.

Referring to the drawings, the phonograph, illustrated, may suitably be enclosed within a cabinet (not shown) and it may be arranged for control by means of coins inserted in the usual manner. This control may be effected by means of an accumulator switch 60 which brings the contacts 61 and 62 into engagement when one or more coins are inserted. These contacts control the supply of energy to the motor 63.

The phonograph may suitably be mounted on a base 64 and may comprise a chassis or frame 65 upon which the accumulator switch 60 is mounted. The motor 63 is also mounted on the chassis 65 by means of adjustable supports 66 whereby the motor may be brought closely into alignment with the shaft 67 which it operates.

Suitable couplings 68 may be interposed between the spindle of the motor and the shaft 67. The shaft 67 carries a worm 69 which cooperates with a worm gear 70 mounted on a spindle 71. The spindle 71 is vertical and has a lower bearing 72 on the chassis and the upper bearing 73 provided by a yoke 74 which depends from a cross member 75 of the chassis. The spindle 71 is also provided with a bearing in the cross member 75 and it may be secured in position by means of collars 76 rigidly mounted on the spindle on each side of this bearing, as best seen in Fig. 24.

The spindle 71 is provided with a worm 77 which continuously operates a gear 78 which is freely mounted on the main cam shaft 79. The gear 78 has rigidly secured thereon a disc 80 which is provided with a series of circumferential openings 81. The gear 78 is adapted to be clutched to the main cam shaft 79 by means of a pin 82 which is adapted to move into any of the openings 81. The pin 82 is rigidly mounted on the flange 83 of a sleeve 84 which is slidably mounted on the shaft 79 (Fig. 39). The sleeve 84 is held against rotation on the shaft 79 by means of a block 85 rigidly mounted on the cam shaft 79 and provided with a slot 86 in which the pin 82 is located.

The sleeve 84 is biased towards clutching position, that is, it is biased downwardly as viewed in Fig. 39, by means of a spring 87 which abuts against one end of the sleeve 84 and against the boss of a cam 88 rigidly mounted on the cam shaft 79. The sleeve 84 carries on its periphery a tapering cam member 89 which is adapted to cooperate with the end of an arm 90 which is rigidly mounted on a shaft 91.

As will hereinafter be described, immediately before a record is played, the arm 90 descends into engagement with the sleeve 84. The shaft 79 rotates in the clockwise direction as viewed from the front of the machine, that is, it rotates from left to right on Fig. 39, the tapering cam formation 89 comes into contact with the end of the shaft, with the result that the shaft is forced laterally in the rearward direction, that is, in the upward direction as viewed in Fig. 39, with the result that the cam shaft 79 is disconnected from the gear 78 so that the movement of the cam shaft is terminated until the arm 90 rises, which occurs at the end of the playing of each record, as will hereinafter be described. When the arm 90 so rises, the sleeve 84 is returned by the spring 87 so as to clutch the cam shaft to the gear 78 for continued rotation.

The cam shaft 79 carries a cam 92 at its rear end and cams 93, 94, 95 and 96 forwardly of the gear 78. It may here be explained that the shaft 79 is given one revolution for the playing of each record and this revolution is in two parts. Thus, if one record is being played, the shaft gets approximately three-quarters of a revolution at the beginning of the playing and at the end of the playing the remainder of the revolution is completed. When a sequence of records is being played without interruption, the latter period of revolution of shaft 79 for one record is continuous with the initial period of revolution for the next record. In either case the cam comes to rest when the playing of the record starts and at that time the cam 93 has the position shown in dash and dotted lines in Fig. 43.

A carriage 97 is slidably mounted on the spindle 71 above the worm 77 by means of two perforated flanges 98. The carriage 97 is prevented from rotation by means of projections 99 on the cross member 75 of the chassis. The carriage 97 carries a roller 100 which rides upon the cam 93. It will be readily understood that rotation of the cam 93 from the full line position shown in Fig. 43 to the dot and dash position shown in that figure will result in moving the carriage 97 upwardly.

The upper extremity of the spindle 71 extends into the elongated sleeve 101 depending from a turntable 102. The spindle 71 is provided with a longitudinal slot 103 into which projects a set screw 104 carried by the sleeve 101. Consequently, the turntable is capable of free longitudinal movement on the spindle 71, but is caused to rotate therewith. The lower end of the sleeve 101 rests on the carriage 97. Consequently, the cam 93 effects a limited upward movement of the turntable 102.

It may be noted that the turntable carries at its upper end a short centering pin 105 which is independent of the spindle 71. The centering pin 105 preferably has a sharp point so as to aid in the proper location of the record upon the turntable in the event that that may be necessary in certain cases. It will be noted that when the cam 93 moves away from its dot and dash position of Fig. 43, which it does at the end of the playing of each record, the carriage 97 descends to its lowermost position and the turntable moves downwardly by gravity to its lowermost position.

The cam 88 is adapted to cooperate with a roller 106 carried on a lever 107. The lever 107 is pivotally mounted at its upper end on the chassis, as shown in Fig. 36. The lower end of the lever 107 is connected by means of a link 108 to an arm 109 of a swinging frame 110. The lower end of the swinging frame 110 is pivoted at 111 on the chassis. At a higher position the frame 110 has an eye member 112 which surrounds a vertical rod 113 which is slidably mounted on the chassis, as will hereinafter be more fully described.

The swinging frame 110 comprises an upwardly projecting arm 114, the function of which will hereinafter be more fully described. It may be noted that in the initial position of the machine, that is, before it starts to play, the cam 88 has the position shown in Fig. 36. The lever 107 is biased towards the position shown in Fig. 36 by means of a spring 117. Before playing is initiated, the cam 88 moves into the position shown in Fig. 37 and there it stays until the playing of the record is completed.

The cam 88 carries on one side a roller 115. In the movement of the cam from the position shown in Fig. 36 to the position shown in Fig. 37, the roller 115 engages a pin 116 which projects laterally from the arm 90. This pin is located so that the passage of the roller 115 depresses the arm downwardly towards the sleeve 84. At the time this happens the cam formation 89 has been moved out of the way of the arm 90. The shaft 91 on which the arm 90 is rigidly mounted, is pivotally mounted on the chassis. A downwardly extending arm 118 is also rigidly mounted on the shaft 91.

This arm carries at its lower end a pin 119 which projects through an opening 120 in the chassis. The projecting end may cooperate with a leaf switch 121 so as to close this switch when the arm 90 is in its downward position. The arm 90 is biased towards its uppermost position by means of springs 122 which are connected to the pin 119 and to the arm 118 and to other suitable parts of the device.

The inner end of the pin 119 is flattened, as shown in Fig. 38, to enable it to cooperate with a latch 123 which is pivotally mounted on the chassis and is biased by one of the springs 122 towards latching cooperation with the pin 119. Consequently, when the arm 118 is moved to the right, that is, when the arm 90 descends, the latch 123 moves downwardly and its squared recess 124 engages the flattened face of the pin 119 so as to hold the arms 90 and 118 in latched position.

Figure 5:
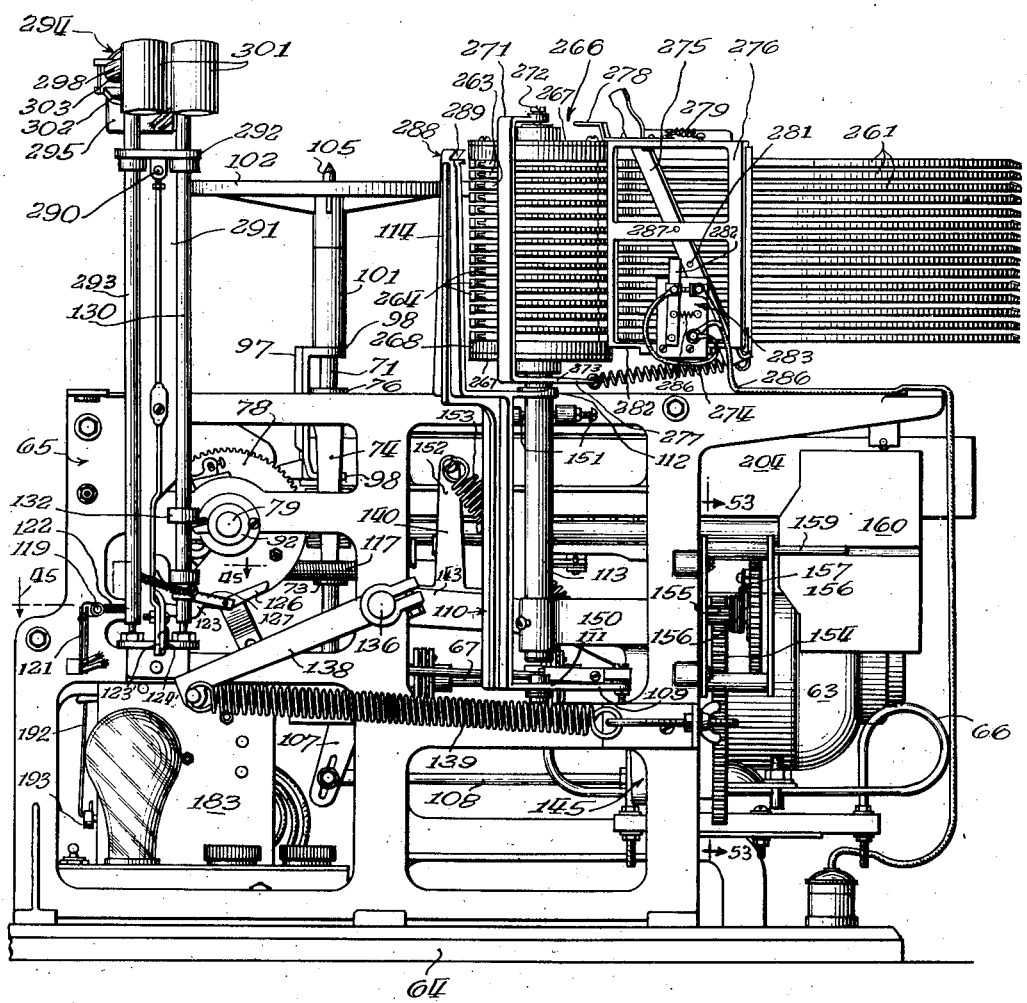
Fig. 5 is a rear view.

Immediately to the left of the squared recess 124 the latch 123 is provided with a sloping surface 125. Immediately the right-hand end of the latch 123 is raised so that the pin 119 clears the squared recess 124, the tension of the springs 122 acting upon the arm 118 causes the arm 118 to move to the left, the pin 119 sliding along the sloping face 125 of the latch 123. The opposite end of the latch 123 is shown in Figs. 5 and 49. Since these are views from the rear of the machine, this end of the latch 123 appears to the right. In Figs. 45, 46 and 47 it appears to the left.

The extremity of the latch member 123 is provided with an upwardly sloping portion 126 and immediately adjacent thereto the latch member carries a serrated portion 127. The two portions 126 and 127 of the latch member 123 are adapted to cooperate with a pivoted pawl 128 and a roller 131 (Figs. 46, 47 and 51). The pawl 128 and roller 131 are carried on the end of an arm 129 which is rigidly mounted on and extends radially from a vertical rod 130 which is pivoted for rotation about its axis, as will hereinafter appear.

The portions 126 and 127 have a form in plan which is somewhat arcuate around the rod 130, as shown in Fig. 45. In the normal operation of the machine the rod 130 being connected to the tone arm or player arm as will hereinafter be described, the pawl 128 moves to the left (Figs. 45, 46 and 47) over the serrated portion 127 of the latch 123 as viewed in Fig. 47. Any reverse movement of the rod 130, such as occurs at the end of the playing of a record of which the track runs into an eccentric groove, would cause the pawl 128 to move the serrated portion 127 downward and thus release the latching member 123. In case a record of another known type is being played, that is, a record in which the sound track does not terminate in an eccentric groove, but continues on towards the center at a greater rate than the recorded portion, then the roller 131 is arranged to come into contact with the upwardly sloping portion 126 of the latch member 123. Consequently, in either case the latch 123 is disengaged, the arm 90 is elevated and the sleeve 84 moves forwardly to initiate the final portion of the rotation of the main cam shaft 79. The latch 123 may be manually discharged by a lever 123' which projects outwardly to the rear of the chassis and is pivotally mounted on the chassis. It is normally in an inoperative position by means of a spring 124'.

Also mounted on the rod 130 is a collar 132 which provides a horizontal axis for a roller 133. This roller is adapted to be engaged by the cam 92 after the playing of a record so that the tone arm is returned to initial playing position.

The cam 94 is adapted to cooperate with a roller 134 mounted on an arm 135 which is pivotally mounted on a shaft 136 by means of a sleeve 137. The shaft 136 is pivotally mounted on the chassis and has rigidly mounted at its rear end an arm 138. This arm is biased towards the left, as viewed in Fig. 26, by means of a spring 139 for the purpose of counter-balancing, to some extent, the weight of the records and the parts which move with them.

The sleeve 137 is provided with an integral arm 140 which carries at one end a set screw 141. This set screw is adapted to engage, in the non-playing position of the machine, a lug 142 carried on an arm 143 which is rigidly mounted on the shaft 136 and extends to the left of the machine. The left-hand end of the arm 143 is connected by means of a link 144 to a carriage 145 which is slidably mounted upon a vertical rod 146 which is rigidly supported by cross members 147 carried by the chassis.

The carriage comprises upper and lower flanges 148 and 149 which are provided with openings through which the rod 146 extends. The carriage also comprises a rearwardly projecting arm 150 which rigidly carries the vertical rod 113. As hereinafter described, the vertical rod 113 supports the stack of records to be played and the purpose of the cam 94 is to raise and lower this stack of records to various distances, as will hereinafter be more fully described, and to return them to their lowermost position during each cycle of the machine.

Figure 26:
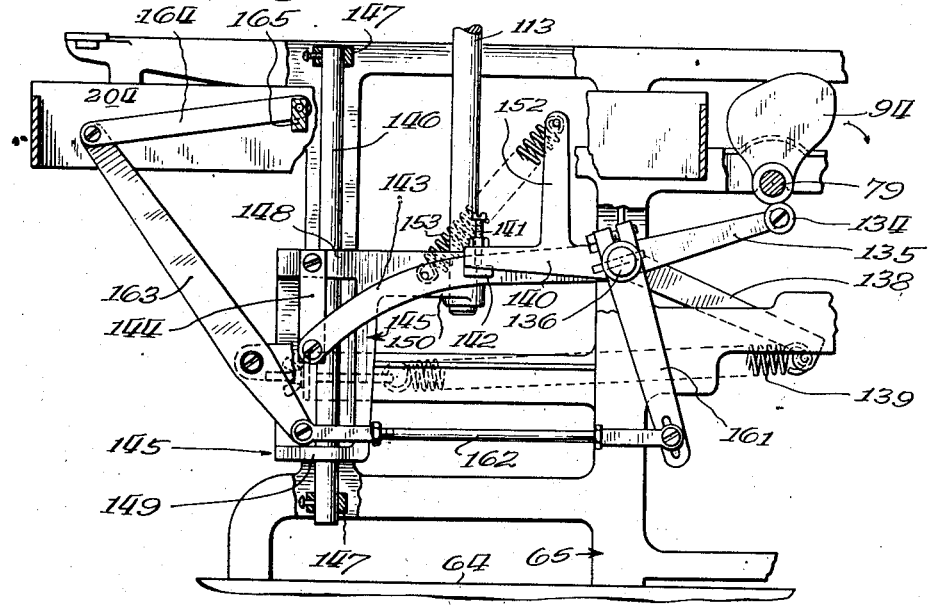
Fig. 26 is a fragmentary section viewed from the front of the machine, with numerous parts broken away and omitted in order to show the mechanism whereby the records are elevated and the selector carriage actuated.
Figure 27:
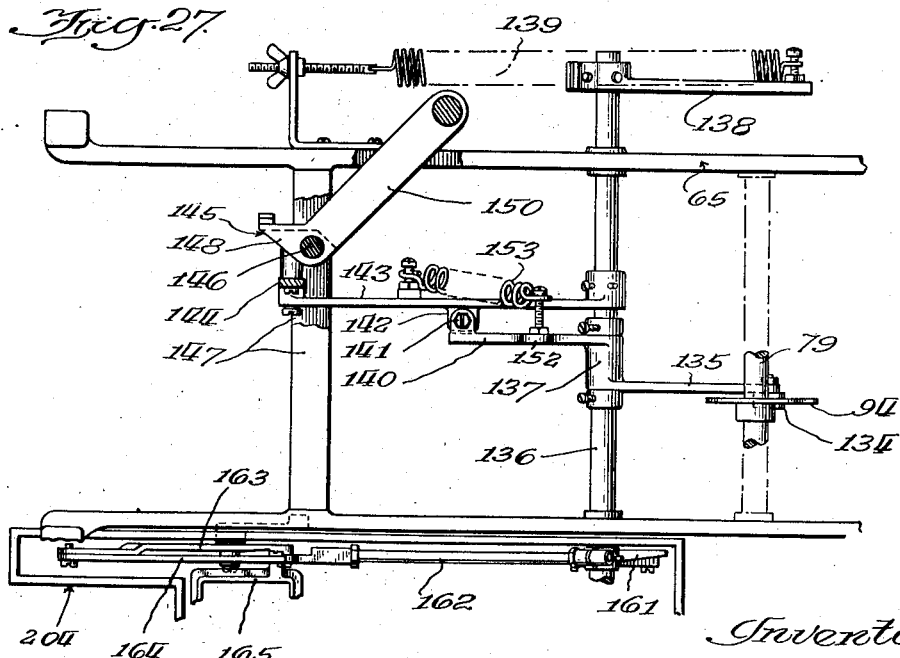
Fig. 27 is a plan view corresponding thereto.
Figure 28:
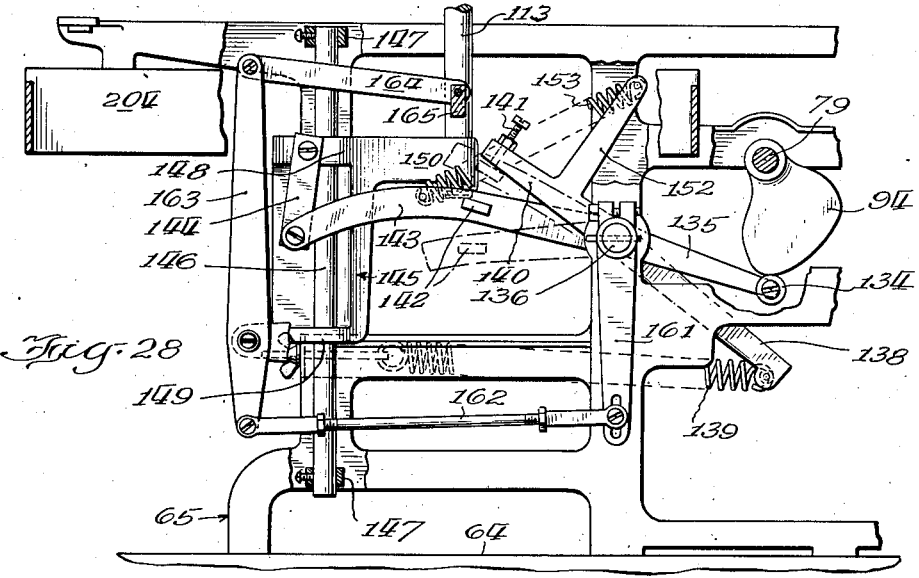
Fig. 28 is a view similar to Fig. 26, showing the elements in a different position, being the position in which the selector carriage is arrested to enable the machine to play the eighth record.
Figure 30:
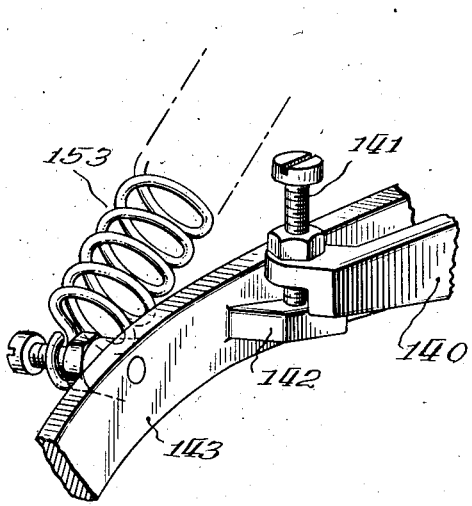
Fig. 30 is a perspective detail of elements shown in Figs. 26, 27, 28 and 29.

The carriage 145 is held against rotation by means of set screws 151 which prevent movement of the vertical rod 113 around the rod 146. The arm 140 is provided with an upstanding integral arm 152 which is connected by means of a spring 153 to the arm 143. The cam 94 has an initial position which is shown in Fig. 26. When the cam shaft 79 is put into operation the cam 94 engages the roller 134 and moves the arm 135 downwardly into the position shown in Fig. 28. This arm being integral with the arms 140 and 152, the latter move into the position shown in Fig. 28.

Figure 29:
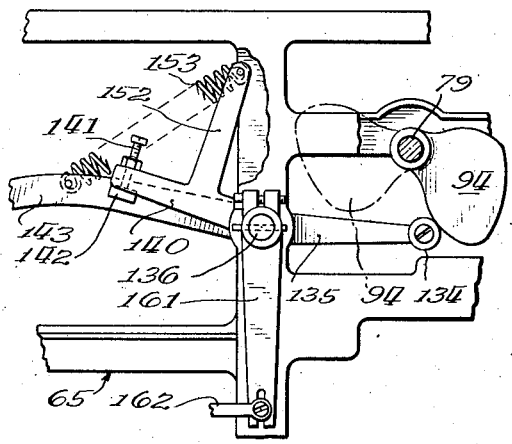
Fig. 29 is a fragmentary view similar to Figs. 27 and 28, showing the relative parts in different relation, the dash and dot line indicating the playing position of the cam 94.

The spring 153 is strong so that the arm 143 tends to follow the arm 140. This movement of the arm 143 is accompanied by an upward movement of the carriage 145. Means are provided, as will hereinafter be more fully described, for arresting the carriage at various positions. When the carriage is thus arrested, the spring 153 extends, this relation being shown in Fig. 28. Means are also provided for maintaining the carriage 145 and the records carried thereby temporarily at selected positions independent of the cam 94 and the arms associated therewith. The cam 94 becomes arrested in the dot and dash position shown in Fig. 29, and the arms 135, 140 and 143 acquire a certain position which may be that shown in Fig. 29, this figure varying depending upon the position in which the stack of records was arrested and is being held.

The carriage 145 has mounted thereon a vertical rack 154 which is adapted to cooperate with a pinion 155 mounted on the chassis. This pinion is connected through an overrun clutch 156 to a gear 157. The gear 157 meshes with a pinion 158 on a shaft 159, which shaft carries a relatively large blade 160. When the carriage 145 descends, as will hereinafter be described, the clutch 156 connects the pinion 155 to the gear 157 and, consequently, the downward movement of the carriage 145 is resisted by the resistance of the air to the rotation of the large blade 160. Consequently, the carriage 145 descends at a slow speed and the mechanism and records are not subjected to shocks or impacts. When the carriage 145 is moved upwardly, the clutch 156 is loosened so that practically no air resistance is created by the blade 160.

On the forward side of the chassis the shaft 136 carries an arm 161 which is connected by a link 162 to a lever 163 pivoted near its lower end to the chassis. Its upper end is connected by a link 164 to a carriage 165 which is adapted to be arrested at predetermined positions to effect the playing of records selected from the stack carried by the rod 113. At its forward extremity the shaft 136 carries a hook member 166. Adjacent this hook member is mounted a switch lever 167 (Fig. 1) which is adapted to be rotated counter-clockwise in order to start the motor and keep it running uninterruptedly, as an aid to changing the records.

The lever 167 is adapted to be held in one extreme position or the other by means of an off-center position spring 168. The upper end of the lever 167 is adapted to engage an extension 169 carried on a block 170 of insulating material which is pivoted on the accumulator switch 60 and which carries the contact 61. When the last button 212 is pressed and the switch lever 167 is manually thrown out of the position shown in Fig. 1, it acts on the extension 169 and forcibly moves the contact 61 downwardly into engagement with contact 62. The closing of the switch starts the motor 63 and causes the mechanism to elevate the records to their highest position. When this is achieved the arm 166 throws the arm 167 back to initial position, stopping the motor and leaving the records in their highest position for changing, etc.

The cam 95 is provided with a pin 171 which has a position at approximately 171' (Fig. 21) during the playing of a record. Immediately after the playing of a record the main cam shaft 79 begins to rotate and the pin 171 comes into contact with a rod 172 and moves it downwardly. After the pin clears the rod 172, the cycle of the main cam shaft 79 is complete. The rod 172 is bent and pivotally mounted in the forward part of the chassis. Its forward end rigidly carries a resilient arm 173 which is adapted to engage the top of the bar 170 of the accumulator switch 60. The pin 171 may suitably be mounted in an arcuate slot 174 so that its position on the cam 95 and the point at which the motor stops after the completion of a cycle, may be accurately determined.

The accumulator switch 60 comprises a ratchet wheel 175 which is biased in the counter-clockwise direction by means of a spring 176. When a coin is inserted in the coin chute (not shown), the electromagnet 177 is energized an appropriate number of times, which may be one or may be any number. Thus, the inserted coin may actuate a switch which completes a circuit through the magnet 177 or it may energize a series of switches, for example, five switches, so that the magnet 177 is energized five times.

Each time the magnet 177 is energized the armature 178, which is pivotally mounted at 179, is attracted against the tension of the spring 180. The armature 178 carries an escapement 181 which cooperates with the ratchet wheel 175 so as to permit the spring 176 to rotate the ratchet wheel the distance of one tooth each time the armature 178 is attracted and released.

The contact 62, which cooperates with the contact 61, is mounted on a block 182 which is also of insulating material. The blocks 170 and 182 are pivoted in close propinquity on a base 183, which may also be of insulating material. When the machine is not in operation, the blocks 170 and 182 have the position shown in Fig. 1. A spring 184 connected to these two blocks tends to hold the block 170 against a stop 186 and tends to cause the block 182 to approach the block 170 so as to bring the contacts 61 and 62 into engagement.

When the machine is not playing, a pin 185, which extends rearwardly from the ratchet wheel 175, engages a hook 187 so as to hold the block 182 in the position shown in Fig. 1. When the electromagnet 177 is energized one or more times, the ratchet wheel 175 rotates a corresponding number of teeth in a counterclockwise direction so that the pin 185 is moved upwardly away from the hook 187 and the spring 184 moves the block 182 upwardly so as to bring the contact 62 into engagement with the contact 61.

The pin 185 is also adapted to engage a pin 188 mounted on the panel 183 so as to project forwardly therefrom. This limits the counter-clockwise rotation of the ratchet wheel 175 to approximately one revolution. The upper block 170 has pivotally mounted thereon a pawl 189 which is biased by a spring 190 into a position so that it may cooperate with the teeth of the ratchet wheel 175 when the block 170 is moved downwardly. The block 170 carries a stop 191 to limit the movement of the pawl 189.

Each time that the arm 173 is oscillated downwardly and upwardly the pawl 189 comes into engagement with the ratchet wheel 175 and moves it the distance of one tooth in the clockwise direction, that is, against the tension of the spring 176. As has been previously described, the arm 173 is oscillated downwardly and allowed to return immediately, after the playing of each record. Consequently, if the magnet 177 is energized a predetermined number of times by the insertion of a suitable number of coins, then the ratchet wheel 175 rotates in the counter-clockwise direction through the same number of teeth and the machine will play a sequence of the same number of records, the wheel 175 returning in clockwise direction the distance of one tooth for each record played until after the last record is played.

The pin 185 pulls the hook 187 downwardly and leaves the contacts 61 and 62 separated, as shown in Fig. 1. The block 170 is connected by a link 192 to a suitable counter 193 which is adapted to count the number of records which are played. It may here be noted that when the switch arm 167 is thrown into the position shown in Fig. 10 for continuous playing, the arm 178 is not moved downwardly as far as it is thrown downwardly by the arm 173. The counter 193 is arranged so that it is not actuated by the manipulation of the arm 167.

On the forward side of the ratchet wheel 175 is mounted a pin 194 which is adapted to cooperate with a latch lever 195 which is pivotally mounted at 196 on the chassis. The upper end of the latch lever 195 is biased to the right by means of a spring 197. A stop 198 extending through an opening 198' in the chassis, limits the movement of the latch to the right so that in its extreme right-hand position its upper end is in register with a bar 199, as best seen in Fig. 22. When the machine is not playing, the pin 194 moves the latch lever 195 into the full-line position shown in Figs. 1 and 8; this position is inclined to the left slightly. Thus, in Fig. 8, the last record has been played and the arm 173 is moving downwardly and the latch lever 195 has been swung by the pin 194. When the arm 173 returns, the block 170 will move upwardly into contact with the stop 186, but the block 182 will be held in the position shown in Fig. 1 by the engagement of the hook 187 with the pin 185.

When the electromagnet 177 is energized once, for example, by the insertion of a single coin of the denomination necessary for the playing of a single record, then the elements move into the position shown in Fig. 6. That is, the pin 194 moves away from the latch lever 195 so that it may assume the practically vertical form shown in full lines in Fig. 22. It will be noted that in this position of the ratchet which, for convenience, I term the one-tune position, the latch lever 195 is out of the path of the bar 199. When, however, a greater number of coins, or a coin which may energize the electromagnet 177 a plurality of times, is inserted, the pin 194 moves out of contact with the latch lever 195 and permits it to move into the dot and dash position shown in Fig. 22 during the next initial part of the rotation of the main cam shaft 79. During that time the bar 199 is lifted up and allowed to fall again by gravity.

The cam 95 engages a roller 200 mounted on an arm 201 which is pivotally carried by the chassis. The arm 201 is connected by a spring 202 to the bar 199. The bar 199 is rigidly mounted on a shaft 203 which extends horizontally along the front of the machine, it being mounted within an auxiliary frame 204 mounted on the front of the chassis. The arm 199 is biased downwardly by means of a spring 205 which is secured to a bracket carried by the chassis.

Figure 3:
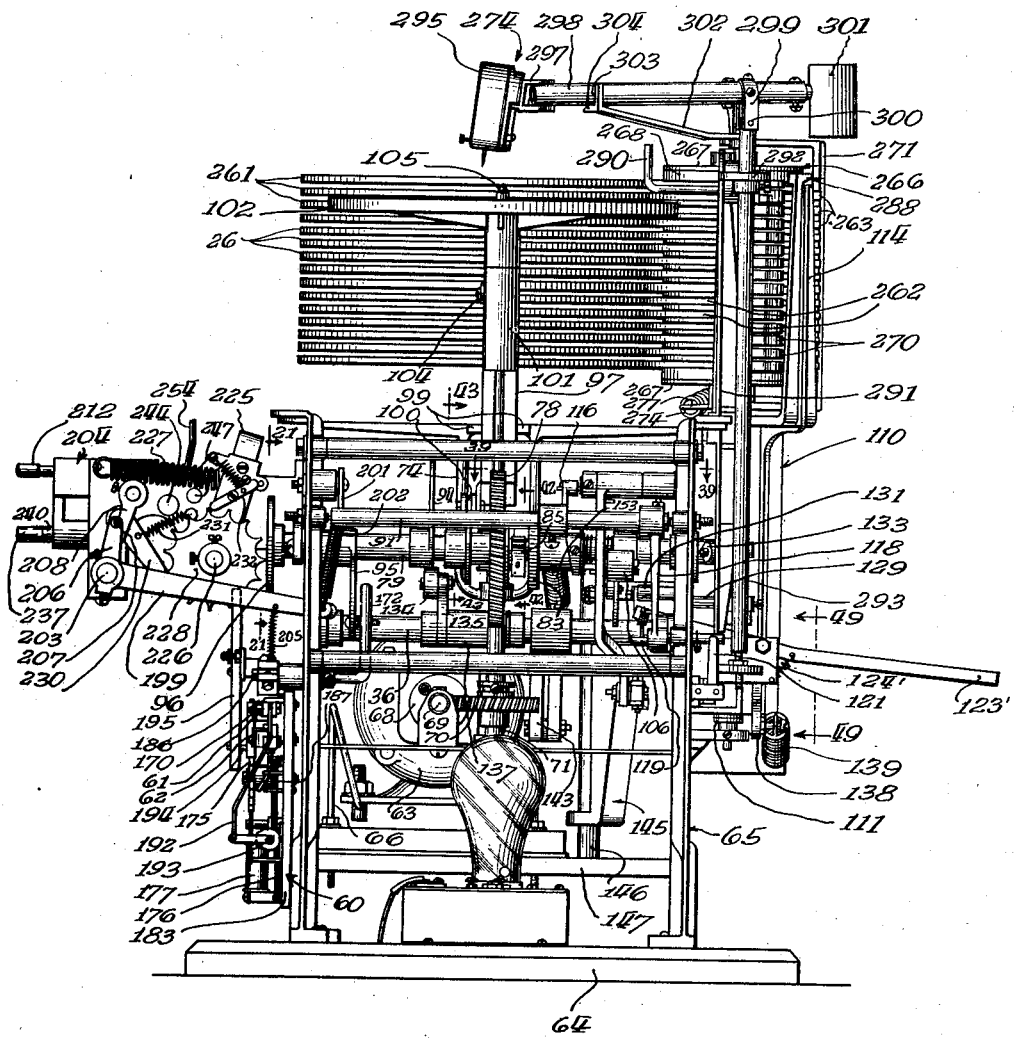
Fig. 3 is an end elevation looking from the right-hand side.
Figure 4:
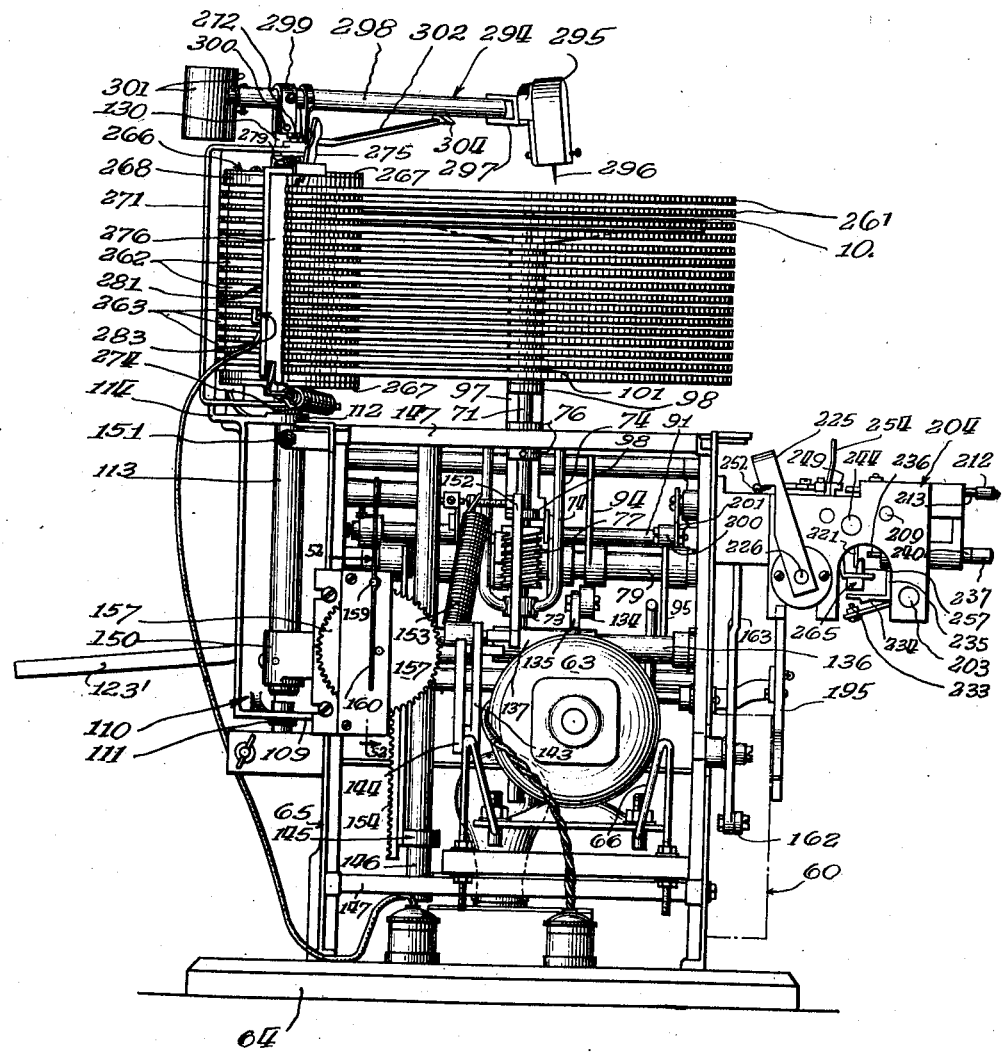
Fig. 4 is an end elevation looking from the left-hand side.

At its forward pivoted end the bar 199 carries a short upstanding arm 206 which carries a projecting pin 207. This pin is adapted to engage an arm 208 rigidly mounted on a bar 209 which is pivotally mounted in the auxiliary frame 204. The normal position of the arm 208 is shown in Fig. 3. When the bar 199 descends into its lowermost position, the arm 208 is swung rearwardly. The bar 209 has mounted thereon a plate 210 which carries the same number of teeth 211 as there are records on the machine. Each of these teeth corresponds and is adapted to cooperate with the button 212 which corresponds to one of the records, as will hereinafter be more fully described.

Figure 2:
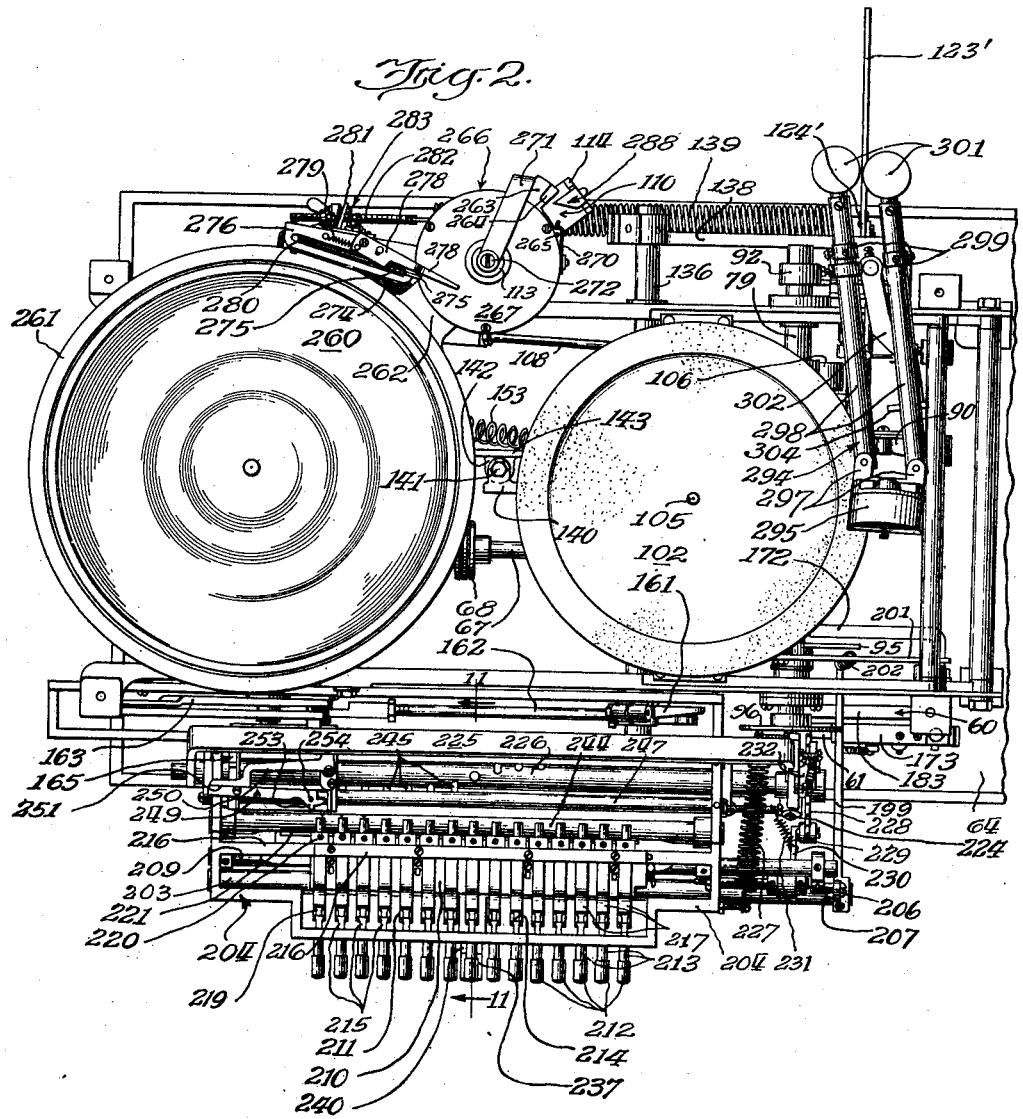
Fig. 2 is a plan view thereof.

Each button 212 is mounted on the front of the machine so as to project through the cabinet (not shown) in which the machine is housed, so that it may be operated from the outside to select the playing of a particular record. As best seen in Figs. 1 and 2, the buttons are located in a horizontal row. Each button 212 is mounted on a horizontal rod 213. When the bar 209 is swung in the clockwise direction, owing to the rise of the bar 199, the teeth 211 move into a position where they may engage a shoulder 214 on any of the rods 213 which have not been pressed inwardly.

It will readily be understood with reference to Fig. 11 that in the event any of the buttons 212 are pressed inwardly, the tooth 211 enters into a recess 215 which is located forwardly of the shoulder 214. The rod 213 has bearings in the front wall of the auxiliary frame 204 and in a longitudinal member 216 on that frame. The member 216 carries a series of resilient members 217 which are adapted to engage in recesses 218 or 219 of the rods 213 to hold these rods in either position of adjustment, that is, their outward position or their inward position. The rods 213 are held against excessive forward displacement by means of collars 220 and against excessive rearward displacement by means of a plate 221 which these collars are adapted to contact when the rods 213 are moved inwardly.

The cam 96 is substantially circular, but is provided with a recess 222, as best shown in Fig. 21. A roller 223 mounted on the end of a rearwardly extending arm 224 is adapted to ride on the periphery of the cam 96. The arm 224 is rigidly mounted on a frame 225 of bail form which is pivotally mounted on an automatic selector bar 226 which extends horizontally and is rotatably mounted in the frame 204.

The frame 225 is shown in its most forward position in Fig. 17. It is biased towards this position by means of a spring 227, but only moves into this forward position when permitted to do so by the roller 223 entering the groove 222 in the cam 96. This occurs during the initial rotation of the main cam shaft 79. In fact, the roller 223 has just been moved out of the recess 222 when the gear 78 is unclutched from the main cam shaft 79.

The selector bar 226 rigidly carries at one end a notched wheel 228 which is provided with a number of notches corresponding to the number of records, in the case illustrated, for example, fifteen. A roller 229 carried by a pivoted arm 230 mounted on the frame 204 is adapted to enter one of these notches under the influence of a spring 231 so as to locate definitely the selector bar 226 in the proper position to effect the playing of one particular record, as will hereinafter be fully understood.

The selector bar 226 carries a corresponding number of radial pins 245, that is, in this case fifteen pins 245 corresponding to the number of records for which the machine is intended. These pins are distributed equidistantly along the length of the selector bar 226, as shown in Fig. 12, and they are located at progressively different angles in the radial direction. The angle between successive radial pins 245 is equal to 360 degrees divided by the number of records to be played by the machine, and in this case amounts to 24 degrees. Consequently, each movement of the wheel 228 by the swinging frame 225 will bring each pin into the position previously occupied by the pin to the left.

The first pin to the left will always be brought, by movement of the frame 225, into the position previously occupied by the last pin on the right. These pins are adapted to cooperate with means for playing the records in series, when voluntary selection is not exercised by the buttons 212, and consequently the machine will play the records in the order corresponding to the left to right direction of the buttons 212 and when the record corresponding to the extreme right-hand button 212 is played, the series will start again, the machine playing the record corresponding to the extreme left-hand button.

The swinging frame 225 carries a spring-pressed pawl 232 which is adapted to cooperate with the notched wheel 228. As shown in Fig. 17, the frame 225 is swung to its extreme forward position, the roller 223 having entered fully into the notch 222 in the cam 96. Consequently, the shaft 226 has been turned through one notch in the counter-clockwise direction, as viewed in Fig. 17. This occurs just at the time the playing of a record is beginning and just before the main cam shaft 79 is arrested at the termination of its initial partial rotation. Consequently, the selector bar is set for the playing of a different record, if the machine is being operated without voluntary selection of records. When the frame 225 swings rearwardly away from the position shown in Fig. 17 into the position shown in Fig. 11, the pawl 232 slips over the star wheel 228.

The shaft 203 which carries the arm 199 is provided with a rigid frame including a bar 233 (Figs. 11 and 19). When the arm 199 is in its elevated position, the bar 233 is moved upwardly from the position shown in Fig. 11 to the position shown in Fig. 19. When in that position it lies in the path of a tooth 234 which is carried by an arm 235. The arm 235 is rigidly mounted on the inner end of a rod 236 which carries on its outer end a discharge button 237.

The rod 236 extends through a housing 238 provided in the frame 204 and has a rear bearing in an opening 239 provided therein. The shaft, near its forward end, has rigidly mounted thereon a sleeve 240 which slides in the housing 238. Within the housing 238 is provided a spring 241 which tends to move the button 237 outwardly.

The arm 235 is held against rotation by means of a pin 242 mounted on the arm, which is received in a slot 243 provided by the frame 204. As will hereinafter be described, the effect of pushing the button 237 inwardly is to force outwardly such of the buttons 212 as may have been pushed inwardly. Under certain circumstances, that is, when the arm 199 is in its elevated position, the bar 233 prevents the inward movement of the button 237.

The inner end of the rod 236, when the same is pushed inwardly, is adapted to engage the lower portion of the plate 221 and swing it in the counter-clockwise direction, as viewed in Fig. 13, into the position shown in Fig. 11. When the plate 221 is thus swung it returns all the rods 213 and the button carried thereby, to their outer position. The plate 221 is rigidly mounted on a bar 244 which is pivotally mounted in the ends of the frame 204. The plate 221 is limited in its movement in one direction by the collars 220 on the rods 213 and in the other direction by contact with the rod 236.

The carriage 165 is slidably mounted on a rod 246 which is rigidly carried by the frame 204. The carriage 165 is prevented from rotation by means of a rod 247 similarly mounted in the frame 204, this rod extending through recessed portions 248 of the carriage 165.

On its upper side the carriage 165 pivotally supports a dog 249 which is normally held in the position shown in Fig. 14, relative to the carriage 165, by means of a bell crank lever 250 which has a flat face 251 bearing against the side of the dog 249, on both sides of its pivot. The flat face 251 is applied to the side of the dog 249 by the pressure of a spring 252 connected to the other end of the bell crank lever 250 and to the carriage 165. Consequently, the dog 249 is resiliently held in the position shown in Fig. 14, but can be moved out of that position in either direction against the action of the spring 252.

At the end of the normal cycle of the machine the carriage 165 moves into its extreme left-hand position and it moves from that position to the right and tends to move to its extreme right-hand position owing to the movement of the arm 143, shaft 136, arm 161, link 162, lever 163 and link 164. Since the arm 143 is moved upwardly by the spring 153, the carriage 165 and its actuating linkage just described may be arrested at any position.

In the event that any of the buttons 212 is pressed inwardly, for example, the second button as shown in Fig. 14, a tooth 253 on the dog 249 will engage the innermost end of the corresponding rod 213 and, consequently, the carriage 165 is arrested and it may here be noted that the carriage 145 is also arrested at a corresponding position. The arrestment of the carriage 145, as will hereinafter be more fully described, determines which record will be played and it may be noted that the second button 212 causes the second record to be played, etc.

As will hereinafter be described, when the carriage 165 is arrested and the carriage 145 is also arrested, the carriage 145 becomes locked in that stationary position before the record starts playing. The dog 249 is provided with an upstanding pin 254 which lies in the path of the bail-shaped frame 225. As previously described, the bail-shaped frame 225 is swung forwardly at the termination of the first part of the rotation of the main cam shaft 79. During this forward movement of the frame 225 it engages the pin 254 and moves it forwardly in the manner shown in Fig. 15, so that the rod 213 which arrested the carriage 165 is moved forwardly into initial position. After the bail-shaped frame 225 moves rearwardly again, the dog 249 resumes its original position with respect to the carriage 165, but the carriage 165 remains in its arrested position until the playing of the record is completed. When that occurs the carriages 145 and 165 move to their initial positions.

The carriage 165 comprises a downwardly and forwardly extending portion 255 on which a dog 256 is pivoted for movement in a horizontal plane. The dog 256 includes an upturned projection 257 which is adapted to engage the forward side of the lower edge of the plate 221. It is drawn against this edge by means of a spring 258, as best shown in Figs. 11, 12 and 16. When the plate 221 is in the position shown in Fig. 11, that is, the position which it has when none of the buttons 212 is pushed inwardly, an arm 259 on the dog 256 lies in alignment with one of the pins 245, being that pin which is projecting horizontally in the forward direction, as shown in Fig. 11. The arm 259 is not in the path of any of the other pins 245. Consequently, if none of the buttons 212 is pushed inwardly and the machine is started by energizing the electromagnet 177 one or more times, the first record played is that one corresponding to the forwardly directed horizontal pin 245. When that record is played the shaft 226 is rotated one step in the counter-clockwise direction, as viewed from the right, and the next pin to the right, as viewed from the front of the machine, is moved into the forwardly directed horizontal position so that the record is played.

It will be noted that when one or more of the buttons 212 is pressed inwardly, the plate 221 is deflected into the position shown in Fig. 13. Consequently, the dog 256 is rendered inoperative with respect to record selection when one or more of the buttons 212 is pushed inwardly.

As has been stated, the carriage 145 carries the records which are to be played. These records, which are designated by the number 260, are mounted in individual ring carriers 261 to support them around their edges. Metal supporting plates may be used with each record to prevent sagging. Each ring carrier has a radial extension 262, as best seen in Fig. 32, which is provided with an opening through which extends the vertical rod 113 carried by the carriage 145. Each radial extension 262 is provided at its extremity with an integral tab 263 which is provided at its edge normally toward the turntable position, with a portion 264 of reduced thickness. Each extension 262 is also provided with a small lug 265.

The carriers 261 are individually supported by means of a cage structure 266 which is rigidly mounted on the bar 113. The cage structure comprises end members 267 which are rigidly held to the bar 113 by means of set screws, and a cylindrical wall portion 268. As best seen in Figs. 32 and 33, the cylindrical wall portion 268 is provided with opposite slots 269 through which extend the extensions 262 in such a manner that the carrier 261 is supported on either side of the bar 113 within the slots formed in the cylindrical wall 268. It may here be noted that the tabs 263 and the lugs 265 project out of the cage structure at the side opposite the record carrier with which they are associated. The cage structure 266 carries spring member 270 which are adapted to engage the lugs 265 when the carriers are in their inoperative position.

A bail 271 is pivotally mounted for rotation on the axis of the bar 113. It may be mounted on the upper end of this bar by means of a screw 272 and it may be mounted on the bar 113 at its lower end by means of an eye portion 273. The vertical portion of the bail 271 is located so that it is normally engaged by all the tabs 263, as shown in Fig. 31. When one of the carriers 261 is moved towards the turntable position its tab catches the bail 271 and carries it into the position shown in Fig. 32 against the opposition of a spring 274.

One end of the spring 274 is connected to the lower end of a lever 275, which is pivotally mounted on a frame 276 rigidly carried by the cage structure 266. The other end of the spring 274 is connected to an arm 277 which is rigid with the eye portion 273 of the bail 271. The lever 275 is normally held in position to apply tension to the spring 274 by means of a latch 278 pivotally mounted on the top of the frame 276. This latch is biased towards latching position by means of a spring 279. When the latch 278 is moved rearwardly, as viewed in Fig. 31, the lever 275 is free to move to the left within a slot 280 in the upper end of the frame 276, with the result that the tension of the spring 274 is reduced and the record carriers may be moved freely around their axes in any direction without any tendency to return. This release of the spring is particularly valuable when it is desired to change the records on the record carriers.

In order to prevent operation of the machine when the lever 275 is thus unlatched, I provide on this lever a rearwardly projecting pin 281 which is adapted to cooperate with an arm 282 of a switch 283 mounted on the frame 276. The arm 282 carries a contact 284 which is adapted to be held in engagement with a contact 285 by a spring 286. It will readily be understood from Fig. 5 that when the lever 275 swings about its pivot 287 on the frame 276 the pin 281 will engage the arm 282 and open the switch 283 which may be arranged in the main circuit of the motor 63.

The upwardly projecting arm 114 is provided at its upper end with a block 288 which is provided with a generally triangular opening 289 on its side directed towards the tabs 263. The block 288 extends inwardly of the arm 114, as best seen in Fig. 31, so that the arm 114 may clear the tabs 264 while the block 288 may engage a selected one of them. The arrestment of the frame carriages 165 and 145 is so arranged that one of the tabs 263 is located on the same level as the block 288. For this purpose the record carriers are mounted on the cage member 266 with uniform spacing, and the distance between two carriers corresponds to a movement of the carriage 165 between two successive pins 245 on the one hand or between two successive pins 213 on the other hand.

The cage member 266 is adjusted on the bar 213 so that the fifteen positions of the carriage 165 correspond to the location of the fifteen records, with the corresponding tabs 263 at the same level as the block 288. The block 288 moves in a fixed horizontal plane which is intermediate the lower and upper positions of the turntable 102. Consequently, when the block 288 swings one record carrier from its normal positions, that is, the left-hand position shown in Fig. 2, into concentric relation to the turntable and then the turntable is moved upwardly, it will lift the record off the carrier, the centering pin 105 entering the record opening and correctly aligning the record on the turntable.

The pin 290, mounted on a standard 291 carried by the chassis, is adapted to be hit by the record carrier at the position of its maximum displacement so as to insure correct adjustment between the record carrier and the turntable. The standard 291 may suitably comprise a horizontal plate 292 which provides an upper bearing for the rod 130 and for a similar vertical rod 293, the lower end of which is mounted on the chassis. The rods 130 and 293 serve for the support of the tone arm 294. This tone or player arm comprises a pick-up 295 which has a needle 296 adapted to cooperate with the sound track of the record. The pick-up 295 is provided on its rear side with two spaced clevises 297 which are connected by vertical axes to two parallel tubes 298.

Near their rear ends the tubes 298 are provided with fittings 299 whereby they are connected to the upper ends of the rods 130 and 293 for pivotal movement about the axes 300. At their rear extremities the tubes 298 carry counterpoise weights 301 whereby the pressure of the needle on the record is accurately predetermined.

The standard 291 carries a forwardly extending bracket 302 which is provided with a recess 303 adapted to receive one of the tubes 298. On the inward or record side of the tone arm the bracket 302 is provided with a sloping surface 304 so that when the tone arm is moved back towards initial playing position, the righthand tube 298, as viewed from the front of the machine, will ride up over the sloping surface 304 into the recess 303. The bracket 302 is so arranged that the needle 296 is then located directly above the uppermost portion of the track of a record which is moved into alignment with the turntable. When the turntable rises the needle enters the track and the player arm is raised clear of the track 302 and the player arm is moved inwardly over the record by the cooperation of the needle and the track.

The operation is as follows: If all of the buttons 212 are in their outward position, the particular record which is played when the machine is put into operation depends upon the selector bar 226. When a coin is inserted for the playing of a single record, the electromagnet 177 is momentarily energized and the ratchet wheel 175 moves one tooth in the counter-clockwise direction, as viewed in Fig. 8. The result is that the latch lever 195 is permitted to move into the position shown in Fig. 6 and in full lines in Fig. 22. It may here be noted that one result of this position of the latch lever 195 is that the selector buttons 212 are released and can be actuated to determine the playing of the next record.

If, however, a plurality of coins be inserted so that the ratchet wheel 175 moves at least the distance of two teeth, then the latch arm 195 is free to move into the dash and dotted line position shown in Fig. 22 the next time that the bar 199 becomes elevated, and the bar 199 is then locked in elevated position, as shown in dot and dash lines in Fig. 22.

As has been previously explained, when the bar 199 is raised, the buttons 212 are locked by the teeth 211 so that they cannot be inserted until all the records corresponding to the number of energizations of the magnet 177, with the exception of the last record, have been played. Consequently, if an operator inserts a plurality of coins and desires the machine to play a continuous sequence, then that sequence cannot be interfered with. But during the playing of the last record a new sequence can be selected by means of the buttons 212 and after the playing of the last record this new sequence will be initiated, if a corresponding number of coins are inserted to actuate the ratchet wheel 175 in the appropriate manner.

Before any coins are inserted, the two switch arms 182 and 170 are in the position shown in Fig. 1. When the electromagnet 177 is energized, the pin 185 moves away from the hook 187 and permits the bar 182 to move upwardly into the position shown in Fig. 6. The latch lever 195 moves in to the full-line position shown in Fig. 6, as has just been explained.

The contacts 61 and 62 being in engagement, the motor circuit is completed and the motor starts operation, driving the turntable shaft 71 and the gear 78. The main cam shaft 79 is left clutched to the gear 78 so that it immediately begins its initial part of the rotation. The first result of the rotation of the cam shaft is the elevation of the arm 201 and the arm 199 so that the buttons 212 are held against inward movement. Then the cam 94 rotates the lever 135 and increases the tension of the spring 153. Consequently, the lever 143 is resiliently moved upwardly and tends to elevate the carriage 145 to its maximum position.

The elevation of the carriage 145 is accompanied by a translation of the carriage 165 and it tends to move across the frame 204. The carriage 165 is normally arrested by the engagement of its dog 256 with the horizontal forwardly projecting pin 245 of the selector bar 226. As has previously been described, the arrestment of the carriage 165 has the effect of leaving the tab 263 of the record associated with that pin 245 on the same level as the block 288 on the upper end of the arm 214. The arrestment of the carriage 165 frequently occurs before the cam 94 has moved the lever 135 down to its extreme low position. The movement of the lever 135 after the arrestment of the carriage 165 is permitted by the extension of the spring 153. During the continued rotation of the cam shaft 79, the cam 88 comes into operation. The roller 115 on this cam engages the pin 116 and swings the arm 90 downwardly into engagement with the sleeve 84.

The downward movement of the arm 90 is accompanied by the rearward movement of the arm 118 and the pin 119 so that the latch member 123 is latched in its upward position. Continued rotation of the cam 88 brings it into engagement with the roller 106 on the lever 107, with the result that this arm is moved to the right and the frame 110 is swung in counterclockwise direction, as viewed in plan. Consequently, the block 288 carried at the upper end of the arm 214 on this frame, which has been located in alignment with one of the tabs 263, engages this tab, the reduced portion 264 thereof entering into the recess 289. It may be noted that the reduced portion 264 of the tab and the recess 289 have flat lower surfaces so that the weight of the records may be taken by the engagement of the arm 214 with the tab 263 (Fig. 35).

The arm 114 swings the tab 263 around the rod 113 so as to bring the record carrier into alignment with the turntable, which is initially located below the level of the block 288. In thus swinging the record carrier into alignment with the turntable, the associated tab 263 engages the bail 271 and carries it from its position shown in Fig. 31 to its position shown in Fig. 32, tensioning the spring 274.

Continued rotation of the cam shaft 79 brings the cam 93 into operation so that the turntable is elevated. During the elevation of the turntable the cam 96 effects the swinging movement of the bail frame 225 forwardly and rearwardly, which has the effect of rotating the selector bar 226 one step so that the next pin 245 in sequence is arranged in the horizontal forward position. The elevation of the turntable raises the record off the carrier in alignment therewith and carries it upwardly so as to bring the beginning of the track on the record into engagement with the pin 296, raising the player arm clear of the bracket 302 upon which it rests.

After the turntable has been elevated, the arm 90 engages the wedge-shaped cam member 89 and forces the sleeve 84 into unclutched position. Before this actuation of the sleeve 84, the roller 200 clears the cam 95 and the arm 201 returns to normal position. Thus the arm 199 is free to assume its lower position, the latch lever 195 being in the full-line position shown in Fig. 22. Consequently, the buttons 212 are released for manual operation. It may be noted that the push button 237 is locked at the same time as the buttons 212.

The tone arm 294 moves inwardly towards the center of the record during the reproduction thereof. In the event that the sound track runs into an eccentric groove near the center of the record, the pawl 128 will be in engagement with the serrated portion 127 of the latch 123 and the reverse or outward movement of the pawl 128 effects the downward displacement of the latch 123 so that the arm 90 is raised and the sleeve 84 is clutched to the gear 78 so as to complete the remainder of the cycle of the cam shaft 79.

The cam 93 moves into a position to permit the turntable to descend and the cam 92 engages the roller 133 so as to swing the tone arm back to initial position. The cam 88 permits the linkage to return the arm 114 to initial position and when it is thus returned it becomes disconnected from the tab 263 so that the supporting frame 145, together with all the records and their carriers, descends to its lowermost position. Immediately the block on the upper end of the arm 114 becomes disconnected from the tab 263, the pin 171 on the cam 95 swings the lever 172 downwardly so that the arm 173 moves the blocks 170 and 182 downwardly into the position shown in Fig. 8, rotating the ratchet wheel 175 the distance of one tooth in the clockwise direction. This brings the pin 185 into a position in which it engages the hook 187 and prevents the block 182 from rising above the position shown in Fig. 1. When the pin 171 clears the lever 172, the blocks 170 and 182 move upwardly into the position shown in Fig. 1, and owing to the separation of the contacts 61 and 62 the machine stops.

If a plurality of coins were inserted without the exercise of manual selection, the operation described would be modified only in the following respects. As has been described previously, the movement of the pin 194 clear of the latch lever 195 would enable this latch lever to move into the position shown in dot and dash lines in Fig. 22 immediately the bar 199 is raised, which occurs immediately the same shaft 79 starts to rotate. Consequently, the buttons 212 and the button 237 remain locked against inward movement until all the records of the number paid for, except the last, have been played. Furthermore, when the arm 170 is moved downwardly into the position shown in Fig. 8 at the end of the playing of a record, both the arms 170 and 182 move upwardly into the position shown in Fig. 6 and this is repeated until the last record paid for has been played, when the pin 185 engages the hook member 187 so as to hold the block 182 in the position shown in Fig. 1. Consequently, between the successive playings the last part of the rotation of the cam shaft 79 associated with the previous record playing, is continuous with the initial part of the rotation for the next record.

The operation of any one of the selector buttons, for example, the second button, renders inoperative any selection by the selector bar 226. Thus, referring to Fig. 13, it will be noted that the rearward displacement of a button 212 brings one of the collars 220 into engagement with the upper edge of the plate 221. The lower edge of the plate 221 consequently displaces the dog 256 so as to hold its tooth 259 out of alignment with any of the pins 245. Consequently, the manual selector renders the automatic selector inoperative. Nevertheless, during each cycle of the machine the automatic selector bar 226 receives a step movement and immediately the buttons 212 are discharged the selector bar 226 again becomes controlling.

With manual selection the operation is substantially the same as that described above in connection with automatic selection. In this case, however, the dog 256 being inoperative, the carriage 165 slides along the frame 204 until the tooth 253 of the dog 249 hits the inwardly displaced pin 213. After the stack of records becomes supported by the block 268, the bail frame 225 swinging forwardly hits the pin 254 and the dog 249 is swung forwardly so that the pin 213 is pushed outwardly to its initial position.

It is to be noted that the bar 199 locks the selector buttons 212 and the discharge button 237 against operation immediately after the main cam shaft 79 begins to rotate and that this locking condition persists until all the records paid for, except the last one, are played. Consequently, a patron may select a program, inserting the appropriate coins in payment therefor, and his program cannot be interfered with until it is completed. During the playing of the last record another patron may make a selection and insert appropriate coins and when the machine starts playing this program the selection he has made cannot be changed, so that the program is protected from change by other people.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In an automatic phonograph, in combination, an automatic selector for controlling the playing of the records in a definite sequence, a manual selector for controlling the playing of a selected plurality of records, a movable carriage which determines which record is to be played, an abutment on said carriage adapted to cooperate with the manual selector to arrest the carriage, an abutment on said carriage adapted to cooperate with the automatic selector to arrest the carriage, and means associated with said manual selector for moving the last said abutment out of operative relation with respect to the automatic selector.

2. In an automatic phonograph, in combination, an automatic selector comprising a plurality of pins, automatic means for bringing said pins successively into a certain position, a carriage movable past said pins, an abutment member on said carriage adapted to engage the pin located in said certain position, a manual selector comprising a second series of pins, each adapted to be moved into operative position, means on said carriage adapted to engage during its travel the pins of the second series thus moved, and means operable by any of last said pins during said movement of the carriage, for moving said abutment member out of operative relation to any of first said pins.

3. In an automatic phonograph, in combination, means for supporting a plurality of records, a carriage determining by its position which of said records is played, a series of manually operable members adapted to arrest the carriage in any selected position to effect the playing of a selected record, said carriage being slidable past said manually operable means, pusher means on the carriage for returning each manually operable member after it has arrested the carriage, a second series of members located along the path of said carriage, a movable abutment on said carriage adapted to engage one of last said members to arrest the carriage, and means actuated by the manually operable members for moving said movable abutment out of cooperative relation with the last said members.

4. In an automatic phonograph, in combination, means for supporting a plurality of records, a carriage determining, by its position, which of said records is played, means for supporting said carriage for movement in a straight line path, a series of abutments arranged along said path and slidably supported so as to be manually displaced from initial positions, means for moving said carriage along said series of abutments, whereby said carriage is arrested by the first displaced abutment in its line of travel, pusher means on said carriage operable after the carriage is arrested for returning the arresting abutment to its initial position, a second series of abutments located along the path of said carriage, a movable abutment on the carriage adapted to cooperate with last said abutments, and means for moving the movable abutment out of cooperative relation with last said series of abutments.

5. A selective automatic phonograph comprising a plurality of record carriers, a turntable adapted for movement upwardly and downwardly, power means for driving the turntable, means for moving any one of said carriers into alignment with said turntable and returning the carrier to initial position, mechanism adapted to be operated by said power means for elevating and lowering the turntable past said carrier to bring the record to playing position and return it to its carrier, a player arm adapted to cooperate with the record in its playing position, a carriage movable to a plurality of positions and determining by its position which record is played, an accumulator switch for controlling the supply of energy to said power means, means for arresting said mechanism during record playing, means controlled by the player arm for resuming the actuation of said mechanism, means for actuating said switch towards opening each time a record is played, a multi-selector for selecting a plurality of records to be played, said selector being adapted to control the movement of said carriage, means adapted to prevent actuation of said selector, and means actuated by said accumulator switch for rendering said preventing means effective.

6. A selective automatic phonograph comprising a plurality of record carriers, a turntable adapted for movement upwardly and downwardly, power means for driving the turntable, means for moving any one of said carriers into alignment with said turntable and returning the carrier to initial position, mechanism adapted to be operated by said power means for elevating and lowering the turntable past said carrier to bring the record to playing position and return it to its carrier, a player arm adapted to cooperate with the record in its playing position, a carriage movable to a plurality of positions and determining by its position wihch record is played, an accumulator switch for controlling the supply of energy to said power means, means for arresting said mechanism during record playing, means controlled by the player arm for resuming the actuation of said mechanism, means for actuating said switch towards opening each time a record is played, a multi-selector for selecting a plurality of records to be played, said selector being adapted to control the movement of said carriage, means for preventing actuation of said selector, and means associated with said accumulator switch and effective when it is set for playing more than one record for rendering said preventing means effective.

7. In an automatic phonograph, in combination, an accumulator switch adapted to be actuated to control the playing of a sequence of records, means for actuating the switch a step towards opening position as each record is played, a manual selector for determining the sequence to be played, means for preventing actuation of the manual selector, and means controlled by said accumulator switch for controlling the selection preventing means.

8. In an automatic phonograph, in combination, an accumulator switch adapted to be actuated to control the playing of a sequence of records, means for actuating the switch a step towards opening position as each record is played, a manual selector for determining the sequence to be played, means for preventing operation of said manual selector, and means controlled by said accumulator switch for rendering said preventing means effective when said switch is set for the playing of a plurality of records.

9. In an automatic phonograph, in combination, a plurality of record carriers, a member on which said carriers are pivotally mounted in superposed relation, means for displacing a predetermined record carrier towards record playing position, a swinging frame adapted to engage all of said carriers, resilient means connected to said frame biassing it towards normal position and causing it to return said carrier to normal position, and means for rendering said resilient means inoperative.

10. In an automatic phonograph, in combination, a plurality of record carriers, a member on which said carriers are pivotally mounted in superposed relation, means for displacing a predetermined record carrier towards record playing position, a swinging frame adapted to engage all of said carriers, resilient means connected to said frame biassing it towards normal position and causing it to return said carrier to normal position, a normally closed switch adapted to interrupt the supply of power to the phonograph, and means for simultaneously opening said switch and rendering said resilient means inoperative.

11. In an automatic phonograph, in combination, a plurality of record carriers, a carriage on which said carriers are pivotally mounted in superposed relation, means preventing axial movement of said carriers on said carriage, means for moving said carriage, means for arresting said carriage at a selected position, a swinging member having a fixed height adapted to engage one of said carriers and move it towards record playing position, and means on said swinging member arranged to support the carrier it engages and thereby the carriage on which the carrier is mounted.

12. In an automatic phonograph, in combination, a plurality of record carriers, a carriage on which said carriers are pivotally mounted in superposed relation, means preventing axial movement of the carriers on said carriage, means operative during the playing cycle of the phonograph adapted to raise the carriage through the depth of the superposed records, means for arresting said carriage at a predetermined position, said raising means including a resilient connection to permit such arrestment, a swinging arm adapted to engage one of said carriers to support same and thereby the carriage, and means for returning the raising means to initial position while the carriage is thus supported.

13. In a multi-selector, automatic phonograph, in combination, a combined manual and automatic selector, a carriage movably mounted in said selector, adapted by its arrested position to determine which record is to be played, said selector including a selector bar, adapted for step by step movement during each cycle of the phonograph, having a plurality of pins projecting radially at different angles and spaced progressively along the bar, a movable abutment member on said carriage adapted to engage the pin which is projected in a certain direction, manually movable pins for voluntary selection of one or a plurality of records, means associated with said manually movable pins and operable by the movement of any of said manually operable pins to move the first said abutment member away from the position of the first said pin projecting in said direction, a second abutment member on said carriage adapted to engage any of the last said pins when so moved to arrest the carriage, and means associated with the arrested carriage for returning said pin to initial position.

14. In a multi-selector, automatic phonograph, in combination, a combined manual and automatic selector, a carriage movably mounted in said selector, adapted by its arrested position to determine which record is to be played, said selector including a selector bar, adapted for step by step movement during each cycle of the phonograph, having a plurality of pins projecting radially at different angles and spaced progressively along the bar, a movable abutment member on said carriage adapted to engage the pin which is projected in a certain direction, manually movable pins for voluntary selection of one or a plurality of records, means associated with said manually movable pins and operable by the movement of any of said manually operable pins to move the first said abutment member away from the position of the first said pin projecting in said direction, a second abutment member on said carriage adapted to engage any of the last said pins when so moved to arrest the carriage, said second abutment member on said carriage being resiliently biassed towards a normal position, and means for moving said second abutment member to move the engaging pin to normal position.

RUSSELL I. WILCOX.